United States Patent
Lee et al.

(10) Patent No.: US 10,907,877 B2
(45) Date of Patent: Feb. 2, 2021

(54) ICE MAKER AND REFRIGERATOR INCLUDING THE SAME

(71) Applicant: LG Electronics Inc., Seoul (KR)

(72) Inventors: Donghoon Lee, Seoul (KR); Seungseob Yeom, Seoul (KR); Donghoon Lee, Seoul (KR); Wookyong Lee, Seoul (KR)

(73) Assignee: LG Electronics Inc., Seoul (KR)

(*) Notice: Subject to any disclaimer, the term of this patent is extended or adjusted under 35 U.S.C. 154(b) by 114 days.

(21) Appl. No.: 16/135,648

(22) Filed: Sep. 19, 2018

(65) Prior Publication Data
US 2019/0086136 A1   Mar. 21, 2019

(30) Foreign Application Priority Data
Sep. 20, 2017   (KR) .................. 10-2017-0121303

(51) Int. Cl.
| F25C 5/20 | (2018.01) |
| F25C 5/04 | (2006.01) |
| F25C 5/08 | (2006.01) |
| F25C 1/24 | (2018.01) |
| F25D 25/02 | (2006.01) |
| F25C 1/04 | (2018.01) |

(52) U.S. Cl.
CPC .................. *F25C 5/22* (2018.01); *F25C 1/04* (2013.01); *F25C 1/24* (2013.01); *F25C 5/04* (2013.01); *F25C 5/08* (2013.01); *F25D 25/021* (2013.01); *F25D 25/027* (2013.01); *F25C 2400/04* (2013.01); *F25C 2400/10* (2013.01); *F25C 2600/02* (2013.01)

(58) Field of Classification Search
CPC ...... F25C 1/04; F25C 1/22; F25C 1/24; F25C 1/246
See application file for complete search history.

(56) References Cited

U.S. PATENT DOCUMENTS

| 1,953,167 A * | 4/1934 | Geyer ................. F25C 1/24 249/70 |
| 2,256,973 A * | 9/1941 | Doherty .............. F25C 1/22 249/52 |
| 2,776,546 A * | 1/1957 | Clark ................. F25C 1/24 62/135 |

(Continued)

OTHER PUBLICATIONS

European Search Report in European Appln. No. 18194848.0, dated Jan. 17, 2019, 6 pages.

*Primary Examiner* — Christopher R Zerphey
(74) *Attorney, Agent, or Firm* — Fish & Richardson P.C.

(57) ABSTRACT

An ice maker includes an ice tray configured to receive water, where the ice tray includes a plurality of partition ribs that partition an inner space of the ice tray into a plurality of cells, an ejector that is configured to rotate relative to the ice tray, that is configured to cause rotation of ice pieces in a rotation direction relative to the ice tray, and that is configured to discharge the ice pieces from the ice tray, and a motor configured to drive the ejector to rotate in a first direction and a second direction opposite to the first direction. The ice tray further includes a protrusion portion that is located at each cell, that protrudes from a lower surface of each cell, and that extends along the lower surface of each cell in a direction corresponding to the rotation direction of the ice pieces relative to the ice tray.

20 Claims, 23 Drawing Sheets

(56) References Cited

U.S. PATENT DOCUMENTS

| | | | | |
|---|---|---|---|---|
| 3,170,308 | A | * 2/1965 | Cucuzza | F25C 1/24 62/320 |
| 3,321,932 | A | * 5/1967 | Orphey, Jr. | F25C 1/24 62/340 |
| 3,359,747 | A | 12/1967 | Linstromberg | |
| 5,056,322 | A | * 10/1991 | Patrick | F25C 1/04 62/351 |
| 7,665,711 | B1 | * 2/2010 | Marchionda | F25C 1/22 249/119 |
| 7,762,092 | B2 | * 7/2010 | Tikhonov | F25C 1/04 62/186 |
| 2007/0170345 | A1 | * 7/2007 | Tsujimoto | F25C 1/243 249/114.1 |
| 2009/0145156 | A1 | * 6/2009 | Rafalovich | F25C 1/24 62/340 |

\* cited by examiner

ICE MAKER AND REFRIGERATOR INCLUDING THE SAME

CROSS-REFERENCE TO RELATED APPLICATIONS

This application claims the benefit of the Korean Patent Application No. 10-2017-0121303, filed on Sep. 20, 2017, which is hereby incorporated by reference as if fully set forth herein.

FIELD

The present disclosure relates to an ice maker and a refrigerator including the same, and more particularly, to an ice maker and a refrigerator including the same, which can increase an amount of ice, facilitate ice separation, and improves energy efficiency.

BACKGROUND

A refrigerator is an apparatus that can store food and keep stored food fresh for a certain time. For example, the refrigerator has a food storage compartment that can maintain a low temperature state based on a cooling cycle to allow food to be maintained at a fresh state.

The food storage compartment may include a plurality of storage compartments having their respective properties that can be different from each other to allow a user to select a storage condition suitable for each type of food based on types and features of food and a storage period of each type of food. In some examples, the storage compartments may include a refrigerating compartment and a freezing compartment.

In examples where the storage compartments include a freezing compartment, a user may take ice out of an ice tray provided in the freezing compartment after opening a freezing compartment door. In some cases, the user may feel inconvenience in separating ice pieces from the ice tray after opening the freezing compartment door and then taking the ice tray out of the freezing compartment. In some cases, when the user opens the freezing compartment door, cool air may discharge from the freezing compartment, which may cause an increase of a temperature of the freezing compartment. In this case, a compressor may be driven for a long time to decrease or maintain the temperature of the freezing compartment.

In some examples, a refrigerator may include an automatic ice maker inside of the refrigerator, which discharges ice separated from the ice tray through a dispenser. In some cases, water may be automatically supplied to produce ice. In some cases, the ice maker may consume energy.

SUMMARY

Accordingly, the present disclosure is directed to an ice maker and a refrigerator including the same, which may obviate one or more problems due to limitations and disadvantages of the related art.

An object of the present disclosure is to provide an ice maker and a refrigerator including the same, in which ice separation is easily made to reduce energy consumption while ice separation is being made.

Another object of the present disclosure is to provide an ice maker and a refrigerator including the same, in which cool air is easily transferred to ice pieces during ice generation to increase an ice making amount and thus improve energy efficiency.

According to one aspect of the subject matter described in this application, an ice maker includes an ice tray that is configured to receive water, where the ice tray includes a plurality of partition ribs that partition an inner space of the ice tray into a plurality of cells, an ejector that is configured to rotate relative to the ice tray, that is configured to cause rotation of ice pieces in a rotation direction relative to the ice tray, and that is configured to discharge the ice pieces from the ice tray, and a motor configured to drive the ejector to rotate in a first direction and a second direction opposite to the first direction. The ice tray further includes a protrusion portion that is located at each cell, that protrudes from a lower surface of each cell, and that extends along the lower surface of each cell in a direction corresponding to the rotation direction of the ice pieces relative to the ice tray.

Implementations according to this aspect may include one or more of the following features. For example, the lower surface of each cell may have a curvature that is constant in the rotation direction of the ice pieces relative to the ice tray. The ejector may include a rotary shaft connected to the motor and configured to rotate about an axis that extends toward the motor, and protrusion pins that protrude radially outward from the rotary shaft toward the plurality of cells, respectively, each protrusion pin being configured to contact an ice piece in a corresponding cell of the plurality of cells. The protrusion portion may include a first protrusion and a second protrusion that are spaced apart from each other. The ice tray may define a recess between the first protrusion and the second protrusion.

In some implementations, a distance of a space defined between the first protrusion and the second protrusion may be greater than a width of one of the protrusion pins. Each protrusion pin may have an end that extends toward the protrusion portion and that is configured to, based on rotation of the rotary shaft, pass between an upper end of the protrusion portion and a bottom surface of each cell. The protrusion portion may have an arc shape corresponding to an inner shape of each cell, where the protrusion portion extends from a first end located at a first height vertically above a bottom of each cell to a second end located at a second height vertically above the bottom of each cell, the second height being different from the first height.

In some implementations, each cell may be configured to accommodate water to a maximum water level with respect to the bottom of each cell, where the protrusion portion has a first end that extends along the lower surface of each cell to a position that is vertically above the maximum water level. In some examples, each protrusion pin may be configured to, based on rotation of the rotary shaft, start to contact the ice piece at a starting area of each cell, where the first end of the protrusion portion is located at the starting area.

In some implementations, the protrusion portion may have a second end that extends along the lower surface of each cell to a position that is vertically below the maximum water level. Each cell may be configured to accommodate water to a normal water level less than the maximum water level, where the protrusion portion has a second end that extends along the lower surface of each cell to a position that is vertically below the normal water level. Each protrusion pin may be configured to, based on rotation of the rotary shaft, contact the ice piece at a starting area of each cell, where the second end of the protrusion portion is located at an opposite side of the starting area.

In some implementations, the protrusion portion may have an upper end that has a round shape. In some examples, the protrusion portion may have an upper end that has an angular shape. In some examples, the protrusion portion may have an upper end that includes a flat surface.

According to another aspect, a refrigerator includes a cabinet that defines a refrigerating compartment, a refrigerating compartment door configured to open and close at least a portion of the refrigerating compartment, an ice maker located at the refrigerating compartment door and configured to generate ice, and an ice bank located vertically below the ice maker and configured to receive ice pieces discharged from the ice maker. The ice maker includes an ice tray configured to receive water, where the ice tray includes a plurality of partition ribs that partition an inner space of the ice tray into a plurality of cells, an ejector that is configured to rotate relative to the ice tray, that is configured to cause rotation of ice pieces in a rotation direction relative to the ice tray, and that is configured to discharge the ice pieces from the ice tray, and a motor configured to drive the ejector to rotate in a first direction and a second direction opposite to the first direction. The ice tray further includes a protrusion portion that is located at each cell, that protrudes from a lower surface of each cell, and that extends along the lower surface of each cell in a direction corresponding to the rotation direction of the ice pieces relative to the ice tray.

Implementations according to this aspect, the lower surface of each cell may have a curvature that is constant in the rotation direction of the ice pieces relative to the ice tray. The ejector may include a rotary shaft connected to the motor and configured to rotate about an axis that extends toward the motor, and protrusion pins that protrude radially outward from the rotary shaft toward the plurality of cells, respectively, each protrusion pin being configured to contact an ice piece in a corresponding cell of the plurality of cells. In some implementations, the refrigerator may further include a dispenser located at the refrigerating compartment door and configured to discharge the ice pieces from the ice bank.

According to another aspect, an ice maker includes an ice tray configured to receive water, a motor configured to rotate with respect to the ice tray in a first direction and a second direction opposite to the first direction, an ejector that is configured to cause rotation of an ice piece in the ice tray relative to the ice tray and that is configured to discharge the ice piece from the ice tray, where the ejector includes a rotary shaft connected to the motor and configured to rotate about an axis that extends toward the motor, and a protrusion pin that protrudes radially outward from the rotary shaft toward the ice tray and that is configured to contact the ice piece in the ice tray. The ice maker further includes a heater configured to selectively supply heat to the ice tray, and a first sensor unit configured to detect a rotation angle of the protrusion pin about the axis of the rotary shaft. The first sensor unit is further configured to, before discharge of the ice piece from the ice tray, detect whether the protrusion pin has rotated by a predetermined angle about the axis of the rotary shaft, and the heater is further configured to be turned off based on the first sensor unit detecting that the protrusion pin has rotated by the predetermined angle.

Implementations according to this aspect, the ice maker may further include an ice bank located below the ice tray, and a discharge guide configured to receive the ice piece from the ice tray and to guide the ice piece to the ice bank. The first sensor unit is further configured to, before reception of the ice piece at the discharge guide, detect the rotation angle of the protrusion pin. In some examples, the first sensor unit may be further configured to detect whether the protrusion pin has rotated by an angle that causes rotation of the ice piece by an angle less than or equal to 90° with respect to a bottom of the ice tray.

In some implementations, the first sensor unit may be further configured to, based on the protrusion pin contacting the ice piece, detect whether the protrusion pin has rotated by an angle that corresponds to a vertical position of the protrusion pin with respect to a bottom of the ice maker. In some examples, the first sensor unit may be further configured to detect whether the protrusion pin has rotated by an angle from which the protrusion pin is designed to contact the ice piece to start movement of the ice piece relative to the ice tray. In some examples, the first sensor unit may be further configured to detect whether the protrusion pin has caused rotation of the ice piece relative to the ice tray by a preset angle based on operation of the heater.

In some implementations, the first sensor unit may be further configured to detect a position of the protrusion pin from among a first position, a second position, and a third position corresponding to rotation angles of the protrusion pin, respectively, where the rotation angles of the protrusion pin corresponding to the first position, the second position, and the third position are different from one another, and the heater is further configured to be turned off based on the protrusion pin being located at the third position.

In some examples, the ice maker may further include an ice bank located vertically below the ice tray and configured to receive ice pieces, where the ejector is configured to rotate the protrusion pin to the first position based on a start of an ice separation operation, to the second position based on an amount of ice in the ice bank corresponding to a limit amount of the ice bank, and to the third position based on movement of the ice piece relative to the ice tray by a predetermined distance. The heater may be further configured to be turned on based on the first sensor unit detecting that the protrusion pin is located at the first position.

In some implementations, the ice maker may further include a first cam portion that is coupled to the rotary shaft of the ejector in which the first cam portion defines a plurality of grooves at an outer circumference of the first cam portion, and a first rotation member configured to rotate relative to the first cam portion in a state in which the first rotation member contacts the outer circumference of the first cam portion. In this case, the first rotation member may be configured to insert to one of the plurality of grooves, and the first sensor unit may be further configured to detect insertion of the first rotation member to one of the plurality of grooves.

In some implementations, the first rotation member may include a magnet located at an end of the first rotation member, and the first sensor unit may include a first hall sensor configured to sense a voltage change based on movement of the magnet relative to the first hall sensor. In some examples, the first sensor unit is further configured to, based on rotation of the first cam portion in the first direction, detect whether the protrusion pin is located at the first position or at the third position, and, based on rotation of the first cam portion in the second direction opposite to the first direction, detect whether the protrusion pin is located at the second position.

In some implementations, the ice maker may further include an ice bank located vertically below the ice tray and configured to receive ice pieces, and a full-ice sensing bar configured to detect whether an amount of the ice pieces in the ice bank exceeds a set height with respect to a bottom of the ice bank, the motor is configured to rotate the full-ice sensing bar with respect to the ice bank. In some examples, the ice maker may further include a second sensor unit configured to detect rotation of the full-ice sensing bar with respect to the ice bank.

In some implementations, the ice maker may further include a full-ice sensing bar rotation gear engaged with the full-ice sensing bar and configured to rotate the full-ice sensing bar, and a magnet located at the full-ice sensing bar rotation gear, where the second sensor unit may include a second hall sensor configured to detect a voltage change based on movement of the magnet relative to the second hall sensor.

According to another aspect, a refrigerator includes a cabinet that defines a refrigerating compartment, a refrigerating compartment door configured to open and close at least a portion of the refrigerating compartment, an ice maker located at the refrigerating compartment door and configured to generate ice, an ice bank located vertically below the ice maker and configured to receive ice pieces discharged from the ice maker, and a controller configured to control operation of the ice maker. The ice maker includes an ice tray configured to receive water, a motor configured to rotate with respect to the ice tray in a first direction and a second direction opposite to the first direction, an ejector that is configured to cause rotation of an ice piece relative to the ice tray and that is configured to discharge the ice piece from the ice tray. The ejector includes a rotary shaft connected to the motor and configured to rotate about an axis that extends toward the motor, and a protrusion pin that protrudes radially outward from the rotary shaft toward the ice tray and that is configured to contact the ice piece in the ice tray. The ice maker further includes a heater configured to selectively supply heat to the ice tray, and a first sensor unit configured to detect a rotation angle of the protrusion pin about the axis of the rotary shaft. The first sensor unit is further configured to, before completion of discharge of the ice piece from the ice tray, detect whether the protrusion pin has rotated by a predetermined angle. The controller is configured to turn off the heater based on the first sensor unit detecting that the protrusion pin has rotated by the predetermined angle.

Implementations according to this aspect may include one or more of the following features. For example, the first sensor unit may be further configured to detect a position of the protrusion pin from among a first position, a second position, and a third position corresponding to rotation angles of the protrusion pin, respectively, the rotation angles corresponding to the protrusion pin at the first position, the second position, and the third position are different from one another.

In some examples, the controller may be further configured to turn on the heater based on the first sensor unit detecting that the protrusion pin is located at the first position. In some examples, the controller may be further configured to turn off the heater based on the first sensor unit detecting that the protrusion pin is located at the third position.

In some implementations, the refrigerator may further include an evaporator configured to supply cool air to the refrigerator, and a compressor configured to compress refrigerant, where the controller is further configured to drive the compressor.

According to another aspect, an ice maker includes an ice tray configured to receive water, an ejector that is configured to rotate with respect to the ice tray, that is configured to cause rotation of ice pieces with respect to the ice tray, and that is configured to discharge the ice pieces from the ice tray, and a motor configured to drive the ejector to rotate relative to the ice tray. The ice tray includes a first guide rib that is located at a lower portion of the ice tray, that extends in a first direction, and that is configured to exchange heat with cool air supplied from a cool air inlet, and a second guide rib that is located at the lower portion of the ice tray, that extends in a second direction transverse to the first direction, and that is arranged at a center region of the lower portion of the ice tray. The ice tray defines, at the lower portion of the ice tray, a first area that includes the first guide rib, and a second area that includes both of the first and second guide ribs, and the first area of the ice tray is located closer to the cool air inlet than the second area.

Implementations according to this aspect may include one or more of the following features. For example, the ice tray may further include a third guide rib that is located at the lower portion of the ice tray, that extends in the second direction, and that is arranged outward of the second guide rib in the first direction. The third guide rib may include a plurality of third guide ribs that are located at ends of the first guide rib, respectively. The first guide rib may include a plurality of first guide ribs connected by the plurality of third guide ribs that are arranged in the second direction. The plurality of third guide ribs may be spaced apart from one another in the second direction.

In some implementations, the first guide rib may include a plurality of first guide ribs that are arranged with a constant interval in the second direction. The first guide rib may include a plurality of first guide ribs, where the second guide rib connects two of the plurality of first guide ribs to each other. In some examples, the second guide rib may protrude from the lower portion of the ice tray downward further than the plurality of first guide ribs. The second guide rib may include a plurality of second guide ribs that are offset from one another in the first direction and that allow flow of cool air in the second direction.

In some implementations, the ice tray may further include a fourth guide rib that protrudes from a front surface of the ice tray and that extends in a vertical direction with respect to the lower portion of the ice tray. The ice tray may further define a third area that includes the fourth guide rib at the front surface of the ice tray, the third area being adjacent to the cool air inlet. In some examples, the ice tray may further defines a fourth area that has a flat surface at the front surface of the ice tray without the fourth guide rib, where the third area of the ice tray is located closer to the cool air inlet than the fourth area.

In some implementations, the fourth guide rib may include a plurality of fourth guide ribs, where a first portion of the plurality of fourth guide ribs extend in the vertical direction by a first length, and a second portion of the plurality of fourth guide ribs extend in the vertical direction by a second length that is different from the first length.

According to another aspect, a refrigerator includes a cabinet that defines a refrigerating compartment, a refrigerating compartment door configured to open and close at least a portion of the refrigerating compartment, an ice maker located at the refrigerating compartment door and configured to generate ice, and a cool air guide located vertically below the ice maker and configured to supply cool air to the ice maker. The ice maker includes an ice tray that is located vertically above the cool air guide and that is configured to receive water, an ejector that is configured to rotate with respect to the ice tray, that is configured to cause rotation of ice pieces with respect to the ice tray, and that is configured to discharge the ice pieces from the ice tray, and a motor configured to drive the ejector to rotate relative to the ice tray. The ice tray includes a first guide rib that is located at a lower portion of the ice tray and that extends in a first direction, and a second guide rib that is located at the lower portion of the ice tray and that extends in a second direction transverse to the first direction.

Implementations according to this aspect may include one or more of the following features. For example, the cool air guide may include a body, a lower portion of the body including a bottom surface of the body, wherein the cool air guide defines an inlet located at a side of the body and configured to receive cool air, and an opening portion at an upper side of the bottom surface of the body. In this case, the cool air guide may be configured to guide cool air received from the inlet to the ice tray through the opening portion of the bottom surface.

In some examples, the cool air guide may extend in the second direction by a length that is less than a length of the ice tray. The ice tray may further include a third guide rib that is located at the lower portion of the ice tray, that extends in the second direction, and that is arranged at sides of the ice tray. In some examples, the ice tray may further include a fourth guide rib that is located at a front surface of the ice tray and that extends in a vertical direction with respect to the lower portion of the ice tray.

In some implementations, the refrigerator may further include a dispenser located at the refrigerating compartment door and configured to discharge ice pieces.

In some implementations, the ice tray may define a plurality of ice making spaces based on partitioning an inner space of the ice tray, where the ice tray includes a protrusion portion that is located in a respective ice making space and that protrudes from an inner surface of the respective ice making space, the inner surface being configured to contact an ice piece.

According to the present disclosure, since energy consumption is reduced during ice making or ice separation, energy efficiency of the refrigerator as well as the ice maker may be improved.

According to the present disclosure, since a contact area between water and the ice tray is increased, the water may quickly be cooled by the cool air.

In some examples, according to the present disclosure, since one ice making space of the ice tray has the same radius as another ice making space, ice pieces may move more easily.

In some examples, since ice pieces generated in the ice tray have a forward moving direction relatively thicker than a backward moving direction, it is not likely that the ice pieces remain in the ice tray without being discharged from the ice tray, whereby reliability in ice separation of the ice maker may be improved.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate implementation(s) of the disclosure and together with the description serve to explain the principle of the disclosure.

DETAILED DESCRIPTION

Reference will now be made in detail to example implementations of the present disclosure, examples of which are illustrated in the accompanying drawings.

Figure 1:
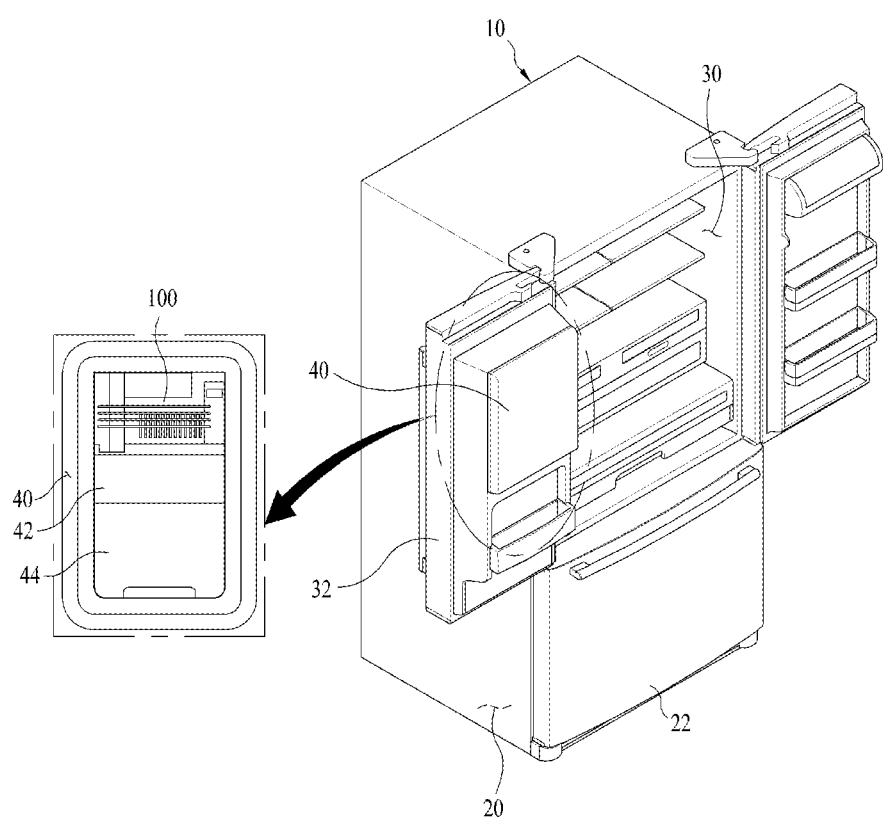
FIG. 1 is a perspective view illustrating an example ice maker located at an example refrigerator door.

FIG. 1 illustrates an example ice maker provided in a refrigerator door according to the present disclosure.

The ice maker may be provided to a bottom freezer type refrigerator in which a freezing compartment is arranged below a refrigerating compartment or a top mounting type refrigerator in which a freezing compartment is arranged on a refrigerating compartment. In some examples, the ice maker may be provided to a side by side type refrigerator in which a refrigerating compartment and a freezing compartment are arranged at both sides.

A refrigerator may include a freezing compartment 20 and a refrigerating compartment 30, in which contents are stored in a cabinet 10 constituting an external appearance. A freezing compartment door 22 and a refrigerating compartment door 32, which are intended to open or close the freezing compartment 20 and the refrigerating compartment, are respectively provided on front surfaces of the freezing compartment 20 and the refrigerating compartment 30. In this implementation, a bottom freezing type refrigerator, in which the freezing compartment 20 is arranged below the cabinet 10, is introduced, but the present disclosure is not limited to this bottom freezing type refrigerator.

The refrigerating compartment 30 is opened or closed at both sides in such a manner that two refrigerating compartment doors 32 are hinge-coupled with a side of a refrigerator main body, and the freezing compartment door 50 is opened or closed in a forward or backward direction of the refrigerator body in a sliding manner.

The freezing compartment door 22 and the refrigerating compartment door 32 may be arranged differently depending positions of the freezing compartment 20 and the refrigerating compartment 30. For example, the refrigerator may be applied to a top mount type refrigerator, a two-door type refrigerator, etc. regardless of types.

An ice making compartment 40 may be provided in any one of the refrigerating compartment doors 32. A sealed space surrounded by a frame is provided at a rear side of the refrigerating compartment door 32, and may form the ice making compartment 40. Since the ice making compartment 40 is adjacent to the refrigerating compartment 30, the ice making compartment 40 may be heat-insulated so as not to generate heat-exchange with the refrigerating compartment 30.

The ice making compartment 40 may be provided inside the freezing compartment 20 or the refrigerating compartment 30. However, considering a user's access convenience and efficiency in use of an inner space of the cabinet 10, the ice making compartment 40 may be provided in the refrigerating compartment door 32.

The ice maker 100 according to the present disclosure is provided inside the ice making compartment 40, and an ice bank 42 and a dispenser 44 are provided below the ice making compartment 40, wherein ice pieces are temporarily stored in the ice bank 42 and the dispenser 44 is to discharge ice pieces in accordance with a user's request.

Figure 2:
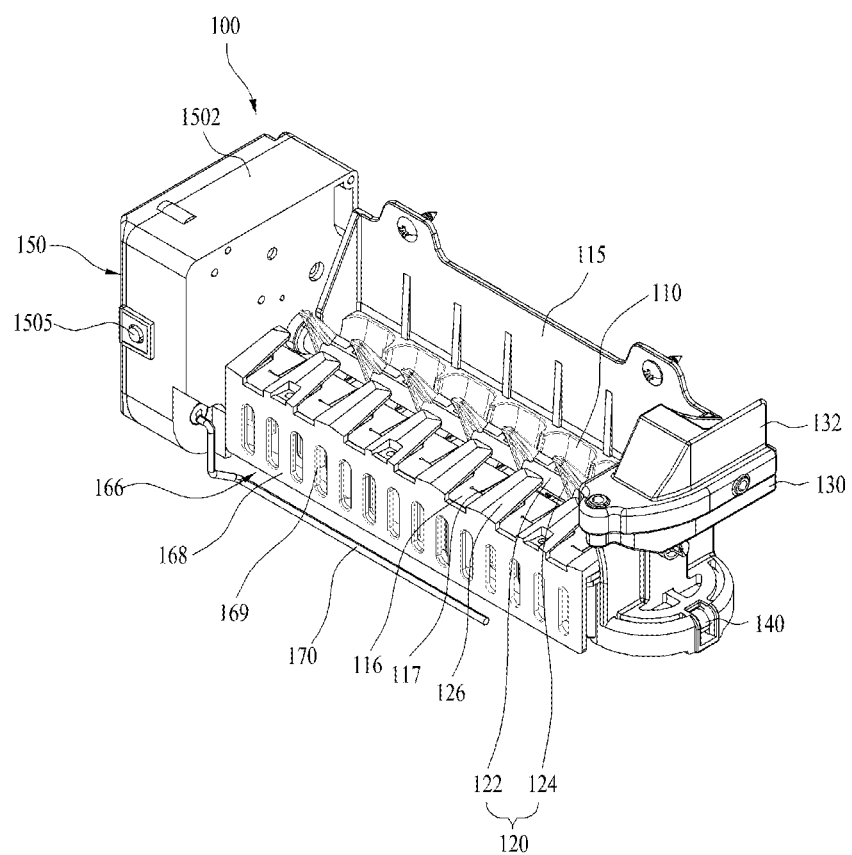
FIG. 2 is a perspective view illustrating an example ice maker.
Figure 3:
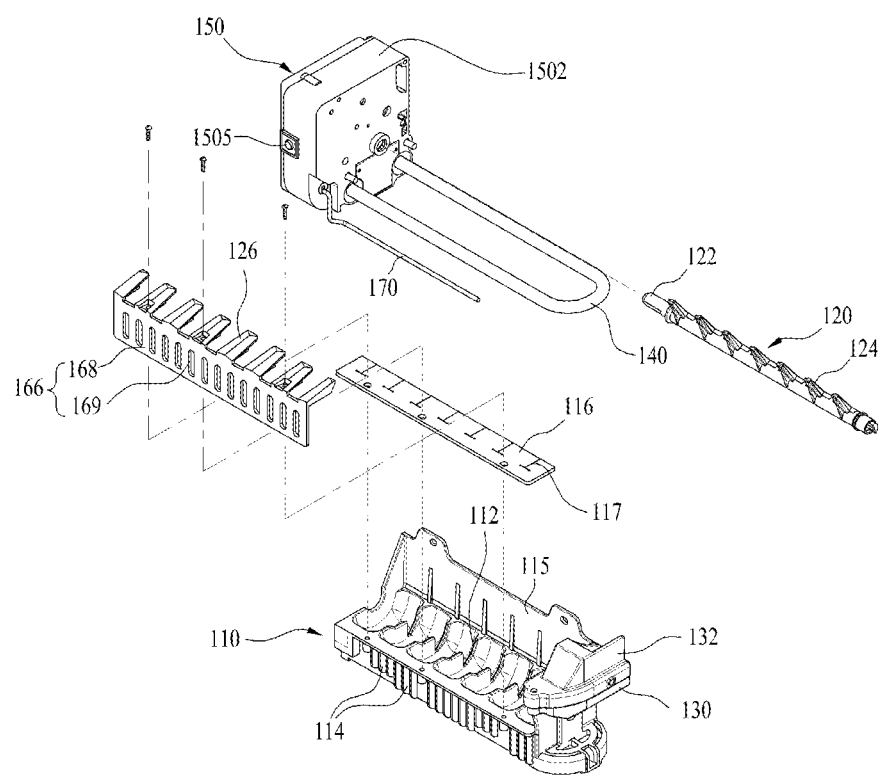
FIG. 3 is an exploded view illustrating the ice maker of FIG. 2.

A perspective view illustrating an external appearance of the ice maker 100 is shown in FIG. 2, and an exploded view illustrating the ice maker 100 is shown in FIG. 3.

The ice maker 100 of the present disclosure includes an ice tray 110 to which water supplied to make ice pieces, an ejector 120 rotated to take out ice pieces made in the ice tray, a heater 140 provided to be in contact with the ice tray, selectively heating the ice tray to easily separate the ice pieces from the ice tray, a case 1502 mounted at one side of the ice tray, and a brushless direct current motor (BLDC) 1510 mounted inside the case 1502, selectively rotating the ejector 120 to enable forward rotation and backward rotation.

The ice tray 110 is a structure where ice pieces are formed by water supply, and has a semi-cylindrical shape with an opened upper portion to store water and ice pieces therein as shown in FIG. 3.

A plurality of partition ribs 112 for partitioning the inner space of the ice tray 110 into a plurality of ice making spaces are provided inside the ice tray 110. The plurality of partition ribs 112 are formed to be extended upwardly inside the ice tray 110. The plurality of partition ribs 112 may allow a plurality of ice pieces to be simultaneously made in the ice tray.

A water supply unit 130 is provided at a right upper portion of the ice tray 110 to allow water to be supplied from an externally connected water supply hose to the ice tray 110.

The water supply unit 130 may include an opened upper portion and a water supply unit cover 132 for preventing water from splashing during water supply.

In some implementations, the ice tray 110 includes an anti-overflow wall 115 for preventing water from overflowing, formed to be extended from a rear upper surface to an upward direction. If the ice maker 100 is provided in the refrigerating compartment door 32, water supplied to the ice tray 110 may overflow in accordance with movement of a door which is generally rotated to be opened or closed. Therefore, the anti-overflow wall 115 forms a high wall at a rear side of the ice tray 110 to prevent water inside the ice tray 110 from overflowing toward the rear of the ice tray 110.

The ejector 120 includes a rotary shaft 122 and a plurality of protrusion pins 124. The rotary shaft 122 is arranged at an upper side inside the ice tray 110 to cross the center in a length direction of the ice tray 110 as shown in FIG. 3. The lower surface of the ice tray 110 has a semi-cylindrical shape having the center of the rotary shaft 122 as the center. The plurality of protrusion pins 124 extend from an outer circumference of the rotary shaft 122 in a radius direction. In some examples, the plurality of protrusion pins 124 are arranged at the same interval along the length direction of the rotary shaft 122. Particularly, the plurality of protrusion pins 124 are arranged one by one per space partitioned in the ice tray 110 by the partition ribs 112.

The heater 140 is arranged below the ice tray 110. The heater 140 is a heat transfer heater, and may have in a U shape. The heater 140 heats the surface of the ice tray 110 to slightly melt ice on the surface of the ice tray 110. Therefore, when the ejector 120 separates ice pieces while being rotated, ice pieces on the surface of the ice tray 110 may easily be separated from the surface of the ice tray 110.

In some implementations, a plurality of discharge guides 126 for guiding ice pieces separated by the ejector 120 to be dropped on the ice bank 42 arranged below the ice maker 100 are provided above the front of the ice tray 110. The plurality of discharge guides 126 are fixed to corner portions at the front of the ice tray 110 and extended to be close to the rotary shaft 122. A predetermined gap exists between the plurality of discharge guides 126. When the rotary shaft 122 is rotated, the protrusion pins 124 pass through the gap. In some examples, the discharge guide 126 may have an upper surface inclined to be higher toward its end, that is, the rotary shaft 122 to allow ice pieces to be slid to the front by the self-load or a weight of ice.

In some implementations, the ice tray 110 further includes an anti-overflow member 116 for preventing water from overflowing toward the front of the ice tray, provided below the discharge guide 126. In some implementations, the anti-overflow member 116 is made in a plate shape to prevent water from overflowing, and is made of a flexible plastic material.

In some examples, when the ejector 120 is rotated, the anti-overflow member 116 are formed provided with "T" shaped slits 117 per position corresponding to the protrusion pins 124 such that the protrusion pins 124 may pass through the anti-overflow member 116. Since the anti-overflow member 116 is made of a flexible material, when the protrusion pins 124 pass through the slit 117, the slit 117 may generate a gap while being deformed, and then may be restored after the protrusion pins 124 pass therethrough.

A driving device 150 for selectively rotating the ejector 120 is provided at an opposite side of the water supply unit 130 in the ice tray 110.

Figure 4:
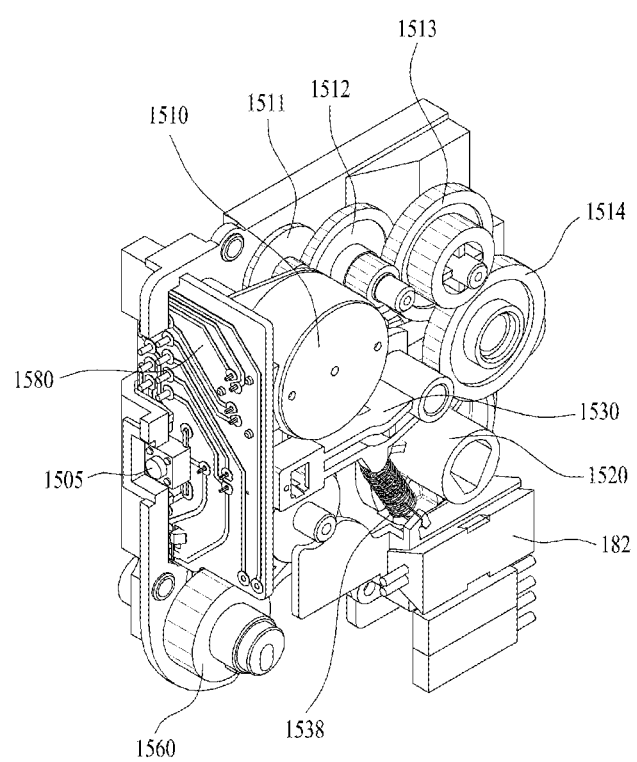
FIG. 4 is a perspective view illustrating an inside of an example driving unit of the ice maker of FIG. 3.

The driving device 150 is provided inside the case 1502 to protect inner parts, and includes a motor 1504 (see FIG. 4) inside the case 1502 as described later. The driving device 150 selectively supplies a power source to the motor 1510 and the heater 140.

In some examples, the motor 1510 selectively rotates a full-ice sensing bar for sensing whether the ice bank 42 arranged below the ice maker 100 is fully filled with ice pieces.

In some implementations, a switch 1505 for experimentally operating the ice maker 100 is provided at the front of the driving device 150. If the switch 1505 is pushed for several seconds or more, the ice maker 100 is operated in a test mode to identify whether there is a problem in the ice maker 100.

The ice maker 100 is provided with an air guide 166 arranged to surround the front below the ice tray 110. The air guide 166 is provide to surround the front of the ice tray 110, a cool air moving path is formed between the air guide 166 and the front surface of the ice tray 110, and a plurality of cool air discharge holes 169 may be arranged at the center of the front portion 168 from side to side. The cool air guided to the lower portion of the ice tray 110 may be discharged to the front surface of the ice maker 100 through the cool air discharge holes 169.

In some implementations, a plurality of fins 114 may be formed on the entire surface of the ice tray 110 spaced apart from the front portion 168. The fins 114 may expedite heat transfer to the ice tray 110 when the cool air is discharged through the cool air discharge holes 169, whereby water may quickly be cooled to quickly generate ice pieces.

The front portion 168 of the air guide 166 may be formed in a single body with the discharge guide 126. In this case, the discharge guide 126 and the anti-overflow member 116 may be fixed to each other using a plurality of screws at the front on the ice tray 110, whereby the front portion 168 may be fixed to the front surface of the ice tray 110 to be spaced apart from the ice tray 110 at a predetermined interval.

Next, a structure of the driving device will be described with reference to FIGS. 4 to 8B.

The driving device 150 includes a case 1502 mounted at one side of the ice tray, and a motor 1510 mounted inside the case, selectively rotating the ejector.

The case 1502 has a cuboid shape, is provided with mounting portions such as various gears and cams therein, and has an opened side to which a cover is coupled.

The motor 1510 rotates the rotary shaft 122 of the ejector 120 at a predetermined angle in a forward or backward direction. In some examples, the motor 1510 may be a motor that enables forward or backward rotation. Particularly, the motor 1510 may be a brushless direct current motor (BLDC).

If the motor 1510 is rotated in a forward or backward direction, a complicated connection structure of a gear and cam for rotating the ejector 120 in a forward or backward direction is not required, and it is easy to rotate the full-ice sensing bar 170, in a forward or backward direction, which may be rotated at a predetermined angle in a forward or backward direction.

In some examples, if the brushless direct current motor is used, since a volume of the motor is smaller than the case that the direct current motor is used, the driving device may have a small volume, whereby the ice tray 110 may be made more greatly in a limited space.

The motor 1510 is deaccelerated through a plurality of reduction gears 1511, 1512, 1513 and 1514 and then axially coupled to the rotary shaft 122 of the ejector 120 to rotate an ejector rotation gear 1520 for rotating the ejector. At this time, since the motor 1510 may be rotated in a forward or backward direction, if the motor is rotated in a first direction, the ejector is rotated in the first direction, and if the motor is rotated in a second direction, the ejector is rotated in the second direction.

In some examples, the plurality of four reduction gears 1511, 1512, 1513 and 1514 are shown, a reduction ratio and the number of the plurality of reduction gears may be controlled properly in accordance with specification of the motor 1510.

In some implementations, the motor 1510 may be connected to a circuit board 1580 provided at one side inside the case 1502 and thus supplied with a power source.

The driving device 150 may further include a first sensor unit for sensing a position of a rotation angle of the ejector, and a second sensor unit for sensing a rotation angle position of the full-ice sensing bar. Each of the first sensor unit and the second sensor unit may include a hall sensor to sense related information.

A first cam portion 1522 may define a plurality of grooves at an outer circumference of the first cam portion 1522. For example, a first cam portion 1522 provided with two grooves made of a disk type and formed at a predetermined angle position on the outer circumference is provided at one side of the ejector rotation gear 1520. The two grooves include a first groove 1523 for defining an initial rotation angle position of the ejector 120 and a second groove 1524 formed to be spaced apart from the first groove 1523 at a predetermined angle. The first groove 1523 may have the same depth as a depth of the second groove 1524, and may define at an angle greater than an angle of the second groove 1524.

A first rotation member 1530 interworking with the first cam portion 1522 in contact with the first cam portion 1522 is provided at one side of the ejector rotation gear 1520. The first rotation member 1530 is provided with a first protrusion 1532 at one side, and the first protrusion 1532 is rotated while sliding along the outer circumference and two grooves of the first cam portion 1522.

A magnet 1534 is provided at an end of the first rotation member 1530, and a first hall sensor 1536 for measuring a voltage signal generated as the magnet 1534 approaches to a position close to the magnet 1534 is provided.

The first hall sensor 1536 is a sensor based on a hall effect of a voltage generated when the magnet 1534 approaches thereto. Since the first hall sensor 1536 is a sensor to which a current flows, the first hall sensor 1536 may be installed in the circuit board 1580.

Since the first rotation member 1530 is pulled to be always in contact with the first cam portion 1522, a first elastic member 1538 is provided between one side of the first rotation member 1530 and a lower fixed position in the case 1502 to be in contact with the first cam portion 1522 by downwardly pulling the first rotation member 1530.

Figure 5:
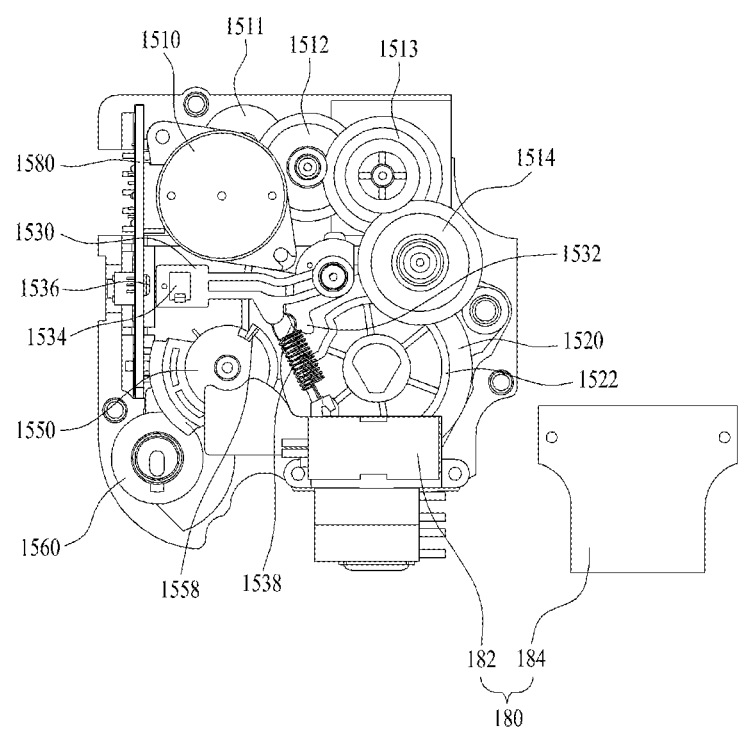
FIG. 5 is a right side view of FIG. 4.

As shown in FIG. 5, in this implementation, the first elastic member 1538 may be installed to be hung between a protrusion downwardly protruded from a middle portion of the first rotation member 1530 and a ring protruded from a position where a temperature sensor 182, which will be described later, is fixed.

The first sensor unit, which includes the first rotation member 1530 and the first hall sensor 1536, may sense a rotation angle of the ejector 120 by sensing a position signal, which corresponds to a case that the first protrusion 1532 is inserted into the first groove 1523 and the second groove 1524 of the first cam portion 1522, when the ejector rotation gear 1520 is rotated.

In some implementations, a temperature sensor unit 180 is provided inside the case 1502 of the driving device 150 to adjoin a side of the ice tray 110 coupled to the side of the case 1502. The temperature sensor unit 180 includes a temperature sensor 182 for measuring a voltage signal according to a temperature of the ice tray 110, and a conducting plate 184 of a metal material interposed to prevent water permeation with the ice tray 110.

The temperature sensor 182 may be buried in a rubber of a waterproof and elastic material, and may be fixed to one side of the case 1502. Since the temperature sensor 182 is to measure a temperature of the ice tray 110, an opening portion, through which the temperature sensor 182 may be exposed, is formed at one side of the case 1502 made of a plastic material.

The temperature sensor 182 is not directly in contact with the ice tray 110 but in contact with the ice tray 110 through the conducting plate 184. Therefore, the conducting plate 184 may prevent water permeation by blocking the opening portion formed at one side of the case 1502 and at the same time measure a temperature of the ice tray 110 to be conducted to the temperature sensor 182. The conducting plate 184 may be made of a metal material having high heat conductivity, and may be fixed to one side of the case 1502 by insert molding after a plate of a stainless material is formed.

In some examples, since the temperature sensor 182 measures a voltage change according to a temperature change, the temperature sensor 182 is connected with the circuit board 1580 by a wire.

Figure 6:
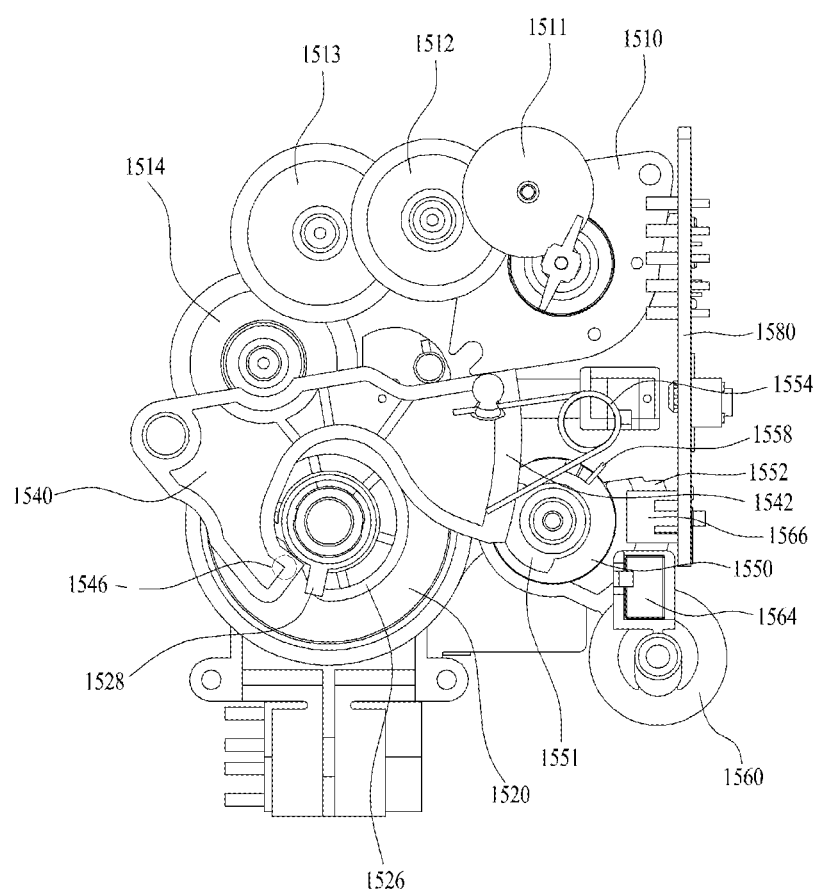
FIG. 6 is a left side view of FIG. 4.

Next, a side view illustrating that the inside of the driving device is viewed from a left side is shown in FIG. 6.

A disk type second cam portion 1526 having a diameter corresponding to a half of a diameter of the ejector rotation gear 1520 is provided at a left side of the ejector rotation gear 1520. A groove 1527 is formed at one side of the second cam portion 1526.

A second rotation member 1540 rotated by interworking with the second cam portion 1526 is provided near the second cam portion 1526. The second rotation member 1540 is rotated at the front of the second cam portion 1526, and is entirely provided to surround the center of the ejector rotation gear 1520. A second protrusion 1546 is formed on a surface at one end of the second rotation member 1540, that is, a surface toward the second cam portion 1526 to be vertical to the surface, whereby a side of the second protrusion 1546 is in contact with an outer circumference of the second cam portion 1526.

The other end of the ejector rotation gear 1520 receives an elastic force to be upwardly rotated by the second elastic member 1554. The second elastic member 1554 has both ends longitudinally spread in a spring type, and provides an elastic force spread in a radius direction unlike the first elastic member 1538 that provides an elastic force pulled in a length direction. One side of the second elastic member 1554 is installed to be hung in a ring portion protruded at the other end of the ejector rotation gear 1520, and other side of the second elastic member 1554 is installed to be hung on one surface of the case.

A protrusion 1528 is formed at one side of the front of the second cam portion 1526 in the rotary shaft of the ejector rotation gear 1520 in a radius direction. The protrusion 1528 is mounted to be rotated at a predetermined angle range with respect to the rotary shaft of the ejector rotation gear 1520.

The protrusion 1528 is rotated at a predetermined angle in the same direction as that of the ejector rotation gear 1520 when the ejector rotation gear 1520 is rotated counterclockwise, whereby the second protrusion 1546 of the second rotation member 1540 may be inserted into the groove 1527 of the second cam portion 1526. On the other hand, the protrusion 1528 is rotated at a predetermined angle in the same direction as that of the ejector rotation gear 1520 when the ejector rotation gear 1520 is rotated clockwise, and is hung in a side of one end of the second protrusion 1546 of the second rotation member 1540, whereby the second protrusion 1546 cannot be inserted into the groove 1527 of the second cam portion 1526 and thus the second rotation member 1540 cannot be rotated.

In other words, the protrusion 1528 may upwardly rotate the second rotation member 1540 only when the ejector rotation gear 1520 is rotated counterclockwise.

An arc shaped large gear portion 1542 is formed at the other end of the ejector rotation gear 1520 and thus coupled with a rotation force transfer gear 1550. Since the arc shaped large gear portion 1542 is rotated in the range of a predetermined angle, the large gear portion 1542 is formed in an arc shape.

The rotation force transfer gear 1550 includes an arc shaped small gear portion 1551 rotated to be engaged with the arc shaped large gear portion 1542, and an arc shaped large gear portion 1552 engaged with the ejector rotation gear 1520, rotating the ejector rotation gear 1520.

Since a rotation angle of the rotation force transfer gear 1550 becomes greater than the arc shaped large gear portion 1542 but does not exceed 180°, the small gear portion 1551 and the large gear portion 1552 may be formed in an arc shape. The arc shaped large gear portion 1552 rotates a full-ice sensing bar rotation gear 1560 to which one end of the full-ice sensing bar 170 is axially coupled.

A third elastic member 1558 is provided between the arc shaped small gear portion 1551 and the arc shaped large gear portion 1552, wherein the arc shaped large gear portion 1552 is rotatably coupled to the third elastic member 1558 relatively with respect to the arc shaped small gear portion. The third elastic member 1558 is a spring fitted into the rotary shaft of the rotation force transfer gear 1550, and its one end is supported in the arc shaped large gear portion 1552 and its other end is supported in the arc shaped small gear portion 1551, whereby an elastic force is provided in an opening direction. Therefore, when the full-ice sensing bar 170 is rotated and descends to sense whether the ice bank 42 has been fully filled with ice pieces, even though the full-ice sensing bar 170 is not rotated any more due to the ice pieces fully filled in the ice bank 42, the third elastic member 1558 may be rotated at a predetermined angle, whereby the gears coupled with each other are not damaged.

The magnet 1564 is fixed to one side of the full-ice sensing bar rotation gear 1560, and a second hall sensor 1566 may be installed at one side below the circuit board 1580. The second hall sensor 1566 may be provided in a protruded shape in view of a relative position with the magnet 1564.

The magnet 1564 is rotated together with the full-ice sensing bar rotation gear 1560 as the full-ice sensing bar rotation gear 1560 is rotated. The magnet 1564 is the closest to the second hall sensor 1566 in a position where the full-ice sensing bar 170 is rotated toward the lowest portion, whereby the second hall sensor 1566 senses a signal at the time when the magnet 1564 is the closest to the second hall sensor 1566. That is, if the second hall sensor 1566 senses that the full-ice sensing bar 170 is upwardly rotated, descends and then is rotated toward the lowest position, the second hall sensor 1566 may sense that the ice bank 42 cannot be fully filled with ice pieces.

In some implementations, the circuit board 1580 is connected with a switch 1505 provided inside the case 1502 of the driving device 150 and partially protruded to the outside of the case 1502. In some examples, the circuit board 1580 is connected with the motor 1510 to adjoin the motor 1510, includes the first and second hall sensors 1536 and 1566 installed therein, and is connected with the temperature sensor 182 provided inside the case 1502 by a wire.

The circuit board 1580 performs a test mode in accordance with an action signal of the switch 1505, rotates the motor 1510 in a forward direction or backward direction by operating the motor 1510, and transfers sensing signals of the first and second hall sensors 1536 and 1566 and the temperature sensor 182 to a main controller provided in the refrigerator main body. In some examples, the circuit board 1580 operates the motor 1510 by receiving an operation command signal from the main controller.

Since the circuit board 1580 does not include a controller for controlling the ice maker 100 unlike the related art, its size may be made with a very small size. Instead, the circuit board 1580 may transfer a sensing signal and a command signal to the main controller, whereby the main controller may control the ice maker 100.

Next, operations of the first rotation member and the second rotation member will be described with reference to FIGS. 7A to 8B.

Figure 7A:
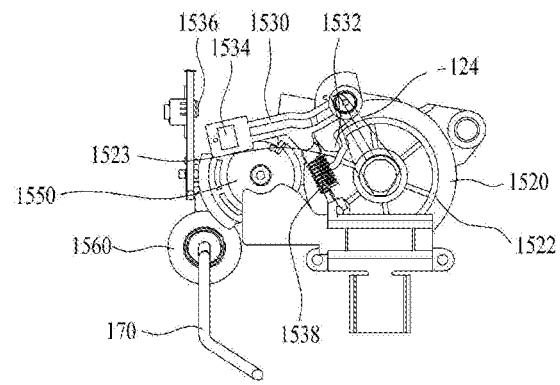
FIGS. 7A to 7C are right side views illustrating example operations of an example first rotation member of the driving motor of FIG. 5.
Figure 7B:
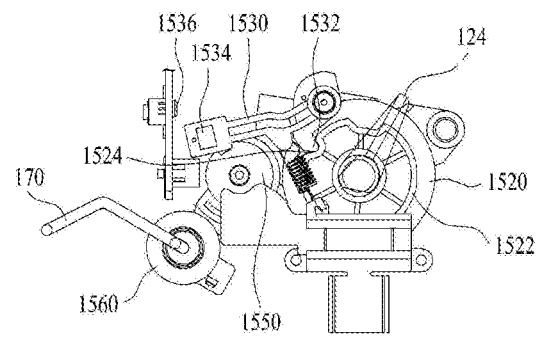
Figure 7C:
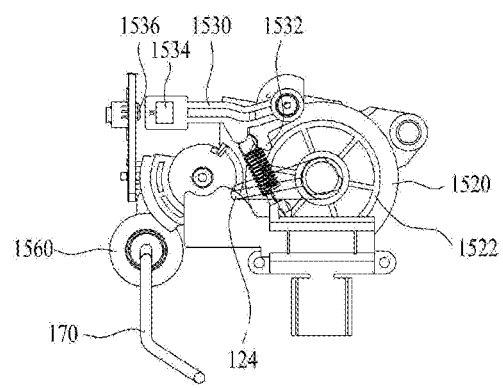

FIGS. 7A to C illustrate some of inner elements of the driving device, wherein an operation state of the first hall sensor unit is viewed from a right side, that is, a side where the ejector exists.

FIG. 7A illustrates a state that the protrusion pins 124 of the ejector 120 are arranged in an initial position (this position is referred to as a "first position"). At this time, since the first protrusion 1532 of the first rotation member 1530 is inserted into the first groove 1523 of the first cam portion 1522, the first rotation member 1530 is pulled by the first elastic member 1538 and downwardly rotated. Since the first hall sensor 1536 is spaced apart from the magnet 1534, the first hall sensor 1536 fails to sense a signal.

FIG. 7B illustrates a state that the protrusion pins 124 of the ejector 120 are upwardly rotated by a reverse rotation of the motor at a predetermined angle for full-ice sensing (this position is referred to as a "second position"). At this time, since the first protrusion 1532 of the first rotation member 1530 is inserted into the second groove 1524 of the first cam portion 1522, the first rotation member 1530 is pulled by the first elastic member 1538 and downwardly rotated. Even at this time, since the first hall sensor 1536 is spaced apart from the magnet 1534, the first hall sensor 1536 fails to sense a signal.

When the first protrusion 1532 passes through the outer circumference between the first groove 1523 and the second groove 1524 of the first cam portion 1522, since the first protrusion 1532 is pushed up by the outer circumference of the first cam portion 1522, the first rotation member 1530 is upwardly rotated in spite of a pulling force of the first elastic member 1538 as shown in FIG. 7C. At this time, since the first hall sensor 1536 is spaced apart from the magnet 1534, the first hall sensor 1536 senses a signal.

That is, the first hall sensor 1536 continuously senses a signal when the first protrusion 1532 passes through the outer circumference not the first and second grooves 1523 and 1524 of the first cam portion 1522, and stops from sensing a signal when the first protrusion 1532 is inserted into the first and second grooves 1523 and 1524 of the first cam portion 1522, whereby the rotation angle position of the ejector 120 may be determined.

In some implementations, if the ejector rotation gear 1520 moves to the position of FIG. 7B, the full-ice sensing bar 170 is rotated to upwardly move in accordance with the operation of the second rotation member 1540 as described later.

In case of the full-ice sensing operation, the ejector rotation gear 1520 is rotated from the initial position of FIG. 7A to the position of FIG. 7B and then rotated to the position of FIG. 7A (rotated clockwise and then rotated counterclockwise). For example, the motor 1510 may rotate the ejector rotation gear 1520 at a predetermined angle in a backward direction and then rotates the ejector rotation gear 1520 in a forward direction. Therefore, as the full-ice sensing bar 170 is rotated from the downward position as shown in FIG. 7A to the upward position as shown in FIG. 7B and then descends toward the downward position, the second hall sensor 1566 senses whether the full-ice sensing bar 170 descends as much as possible, as described later.

If the full-ice sensing bar 170 descends to the maximum downward position as shown in FIG. 7A, it may be determined that the ice bank 42 is not fully filled with ice pieces, and if the full-ice sensing bar 170 fails to descend to the maximum downward position due to ice pieces in the middle of descending toward the downward position, it may be determined that the ice bank 42 is fully filled with ice pieces.

If it is determined that the ice bank 42 is not fully filled with ice pieces, the heater 140 is first heated and then the ejector 120 is rotated at 360° in a forward direction (counterclockwise direction). Then, the ice pieces in the ice tray 110 are separated from the ice tray 110 and dropped onto the ice bank 42. A middle state that the ejector 120 is rotated for ice separation is shown in FIG. 7C. At this state, since the magnet 1534 is maintained to be close to the first hall sensor 1536, the state of FIG. 7C is maintained until the first rotation member 1530 is rotated to descend, and the first hall sensor 1536 continues to sense this state.

In this case, when the ejector 120 reaches the second position of FIG. 7B prior to returning to the initial position (the first position), the heated heater 140 is turned off. Since the heater 140 is an electric heating appliance and needs much power consumption, it is possible to reduce power consumption by reducing the heater operation time.

Figure 8A:
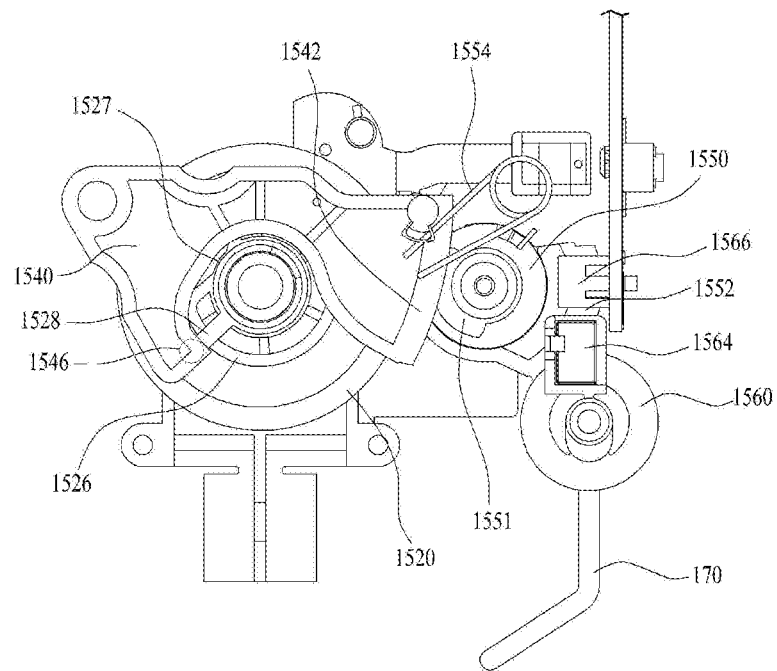
FIGS. 8A and 8B are left side view illustrating example operations of an example second rotation member of the driving motor of FIG. 6.
Figure 8B:
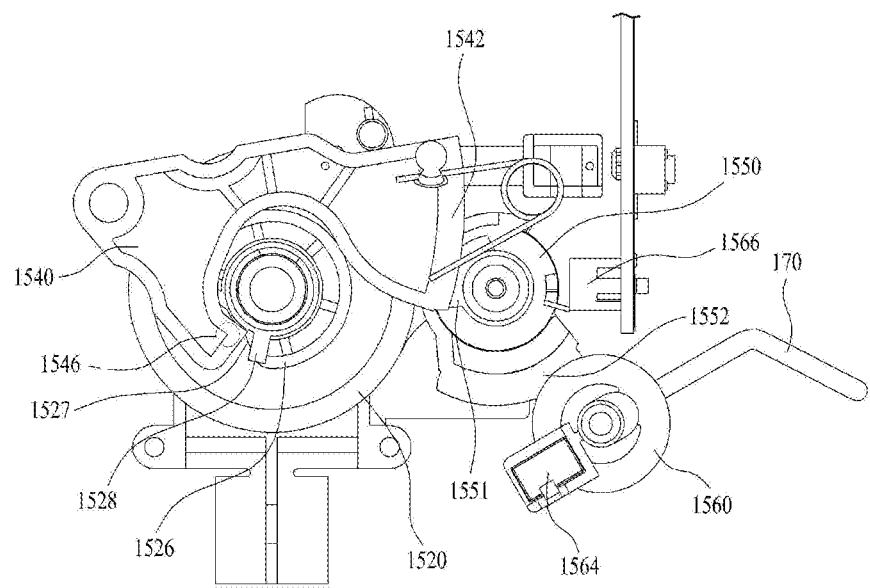

FIGS. 8A and 8B illustrate a state in which the full-ice sensing bar 170 is rotated and the second hall sensor 1566 senses the rotation of the full-ice sensing bar 170 as the second rotation member 1540 is rotated.

FIG. 8A illustrates the state that the second rotation member 1540 is downwardly rotated because the outer circumference of the second cam portion 1526 pushes the second protrusion 1546 when the ejector 120 is in the first position. At this time, since the protrusion 1528 is inserted into a side of one end of the second rotation member, the groove 1527 is hung in the protrusion 1528 even through the groove 1527 reaches the position of the protrusion 1528, whereby the second rotation member 1540 cannot be rotated downwardly.

In this state, the arc shaped large gear portion 1542 formed at the other end of the second rotation member 1540 rotates the rotation force transfer gear 1550 counterclockwise. Therefore, the full-ice sensing bar rotation gear 1560 is rotated clockwise, and thus the full-ice sensing bar 170 descends to the downward position. At this time, since the magnet 1564 is arranged at an opposite side of the full-ice sensing bar 170, the magnet 1564 approaches to the second hall sensor 1566, whereby a sensing signal is generated in the second hall sensor 1566.

FIG. 8B illustrates the state that the ejector 120 is rotated to the second position. At this time, the protrusion 1528 is rotated and come out and at the same time the second cam portion 1526 is also rotated and reaches the position of the second protrusion 1546. Therefore, the second protrusion 1546 is inserted into the groove 1527 of the second cam portion 1526 by an elastic force of the second elastic member 1554, and the second rotation member 1540 is upwardly rotated.

In this state, the arc shaped large gear portion 1542 formed at the other end of the second rotation member 1540 rotates the rotation force transfer gear 1550 clockwise. Therefore, the full-ice sensing bar rotation gear 1560 is rotated counterclockwise, and thus the full-ice sensing bar 170 ascends to the upward position. At this time, since the magnet 1564 arranged at an opposite side of the full-ice sensing bar 170 is far away from the second hall sensor 1566, a sensing signal is stopped in the second hall sensor 1566.

As described above, during full-ice sensing operation, the full-ice sensing bar 170 moves from the position of FIG. 8A to the position of FIG. 8B and then senses full-ice while descending to the position of FIG. 8A.

When the ejector 120 is rotated for ice separation in a forward direction, the ejector rotation gear 1520 is rotated clockwise in FIGS. 8A and 8B (or counterclockwise based on FIGS. 7A to 7C). At this time, since the protrusion 1528 is hung in one end of the second rotation member 1540, the second rotation member 1540 is not rotated, whereby the full-ice sensing bar 170 is maintained at a descending state as shown in FIG. 8A.

Next, a procedure of discharging ice pieces and a control method of an ice maker will be described with reference to FIG. 9.

First of all, if the ice maker 100 is initially driven, the rotation angle position of the ejector is identified using the first hall sensor, whereby the ejector 120 reaches the initial position.

Next, water of a predetermined content is supplied to the ice tray 110 and it is in a standby mode for a freezing time when water is frozen by the cool air. At this time, a temperature of the ice tray 110 may be measured through the temperature sensor 182, whereby water has been completely phase-changed to ice pieces.

Next, the full-ice sensing bar 170 is rotated to determine whether the ice bank 42 provided below the ice maker 100 is fully filled with ice pieces. If it is determined that the ice bank 42 is fully filled with ice pieces, it is periodically sensed whether the ice bank 42 is fully filled with ice pieces, and it is in a standby mode in a state that ice separation is stopped until it is determined that the ice bank 42 is not fully filled with ice pieces. To determine full-ice, the ejector is rotated in an opposite direction of the rotation direction of the ejector shown in FIG. 9. That is, although the protrusion pins 124 of the ejector are rotated counterclockwise, the protrusion pins 124 are rotated clockwise to sense full-ice.

Next, if it is determined that the ice bank 42 is not fully filled with ice pieces, the heater 140 is heated. The heater 140 is heated for a predetermined time before the ejector starts to be rotated. The heating operation may be performed continuously, may be performed intermittently at a predetermined period, or may be performed at a very short pulse period.

Next, when a predetermined time passes after the heater 140 is heated, or when the temperature of the ice tray 110, which is measured by the temperature sensor, is a predetermined temperature or more, the ejector is rotated in a forward direction (e.g., a clockwise direction) to separate ice pieces in the ice tray 110 from the ice tray 110.

At this time, the heater 140 continues to maintain a heating state even after the ejector 120 starts to be rotated, and is turned off before the ejector 120 turns to the initial position. That is, as described above, the first hall sensor 1536 senses that the protrusion pins 124 of the ejector 120 reach the second position and turns off the heater 140 at that time.

When the ejector 120 is rotated for ice separation, since ice pieces are already separated during rotation of 300°, unnecessary operation of the heater may be reduced.

The ejector 120 may be rotated twice not one time during ice separation. The reason why that the ejector 120 is rotated twice is to make sure of complete ice separation in preparation for a case that ice pieces may not be completely separated when the ejector 120 is rotated one time. In some examples, the ice pieces separated from the ice tray may be hung between the protrusion pins 124 of the ejector 120 when the ejector 120 is rotated one time. As the ejector 120 is rotated twice, the ice pieces separated from the ice tray may make sure of being dropped onto the ice bank 42.

Example implementations where the time for ice generation in the ice tray may be reduced and ice separation may easily be made will be described with reference to FIGS. 10 and 11.

In some implementations, an ice making method includes performing heat absorption through heat transfer by supplying the cool air generated by an evaporator to the ice tray for storing water of the ice maker, performing heat absorption through heat transfer between the ice tray and water, and making ice pieces by reducing a temperature of water to a temperature of a freezing point or less. At this time, ice making performance of the refrigerator is determined by a speed of water received in the ice tray 110, which is reduced to a certain temperature of a freezing point or less, and is improved if efficiency of the heat transfer is increased. Therefore, this implementation is focused on increase of efficiency of heat transfer Qice between water and the cool air generated from the evaporator.

A method for increasing a contact electric heating area to increase heat transfer Qice is applied to this implementation.

In some implementations, a protrusion portion 400 provided to be protruded toward an inner space and longitudinally extended along a rotation direction of the ice pieces is provided in a cell which is one space partitioned by the partition rib 112. FIG. 10 is a view illustrating a side cross-section of a cell, and FIG. 11 is a view illustrating a front cross-section of the ice tray.

Since the protrusion portion 400 is protruded toward an inner side of the cell, an inner area of the cell, which may be in contact with water, is increased. Therefore, the cool air supplied to the ice tray 110 may quickly be transferred to water through heat transfer with water received in the cell, and a generating speed of ice pieces may be improved.

Figure 10:
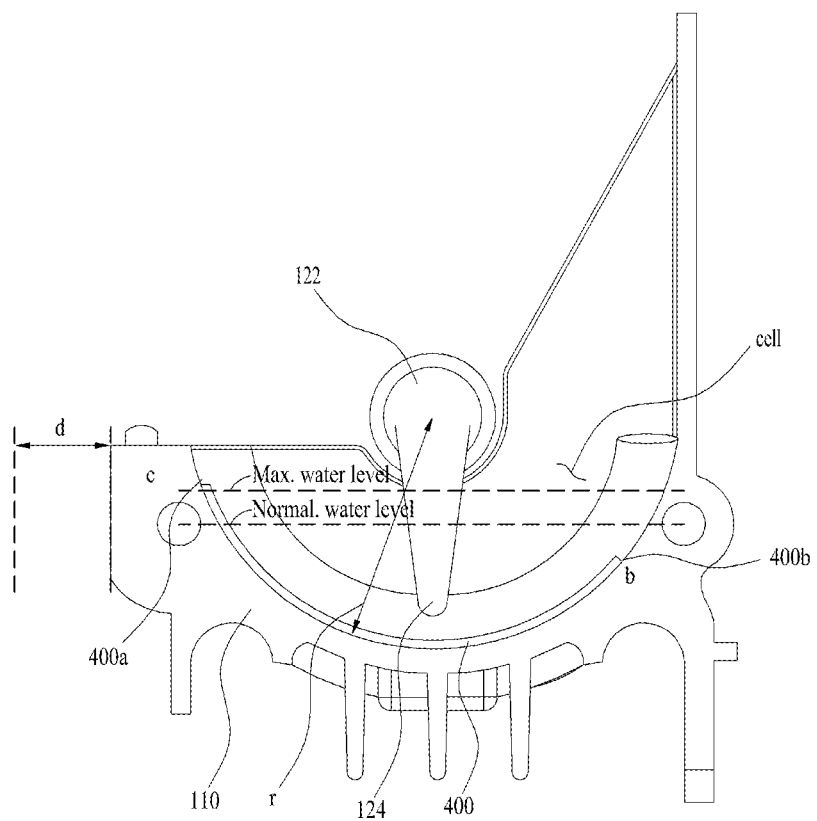
FIG. 10 is a view illustrating an example of a side cross-section of an example ice making space.

In FIG. 10, ice pieces made by the ice tray 110 are rotated to define an arc from a direction 'c' to a direction 'b' by operation of the protrusion pin 124 of the ejector 1200 rotated counterclockwise, whereby the ice pieces are dropped onto the lower end of the ice tray 110 through a space 'd'. Therefore, the protrusion portion 400 for increase of the electric heating area has a vertical cross-section to be matched with the rotation direction of the ice pieces for a certain interval.

In some examples, since the protrusion portion 400 is protruded toward the inner side of the ice making space of the ice tray 110, a water level of water supplied to the ice tray is increased as much as a volume of the protrusion portion 400, whereby the volume of the protrusion portion 400 may be restricted such that a distance between the increased water level and the rotary shaft 122 is not shorter than a certain distance.

In some examples, a shape of the protrusion portion 400 becomes smaller in the portion 'b' of the ice than the portion 'c' of the ice, and a center of gravity may be given to a moving direction of the ice pieces until the ice pieces are dropped onto portion 'd', whereby the ice pieces may be guided to be normally dropped. Therefore, a height of the protrusion portion 400 may be maintained such that the portion 'c' is higher than a normal water supply level and the portion 'b' is lower than the normal water supply level. At this time, the portion 'c' may be higher than a maximum water level such that the protrusion portion 400 may not act as a resistance when the ice pieces move for ice separation.

In some implementations, the one cell may be a space having a certain radius with respect to the rotation direction of the ice pieces. In some examples, the lower surface of the cell has a curvature that may be constant along the rotation direction of ice relative to the ice tray. The protrusion pin 124 guides the ice made in the one cell to be pushed counterclockwise and discharged from the ice tray 110. Since the protrusion pin 124 is a member having a certain size, the protrusion pin 124 uniformly pushes the ice even though the rotation position varies in the cell. For example, if a radius in the cell varies depending on the rotation angle of the protrusion pin 124, a force of the protrusion pin 124, which is applied to the ice, may vary depending on the rotation angle of the protrusion pin 124, whereby various difficulties may occur when the ice pieces are discharged from the ice tray 110.

However, in this implementation, since the cell is formed to have a certain radius therein, the force of the protrusion pin 124, which is applied to the ice, may be maintained uniformly, whereby reliability in ice discharge may be improved.

Figure 11:
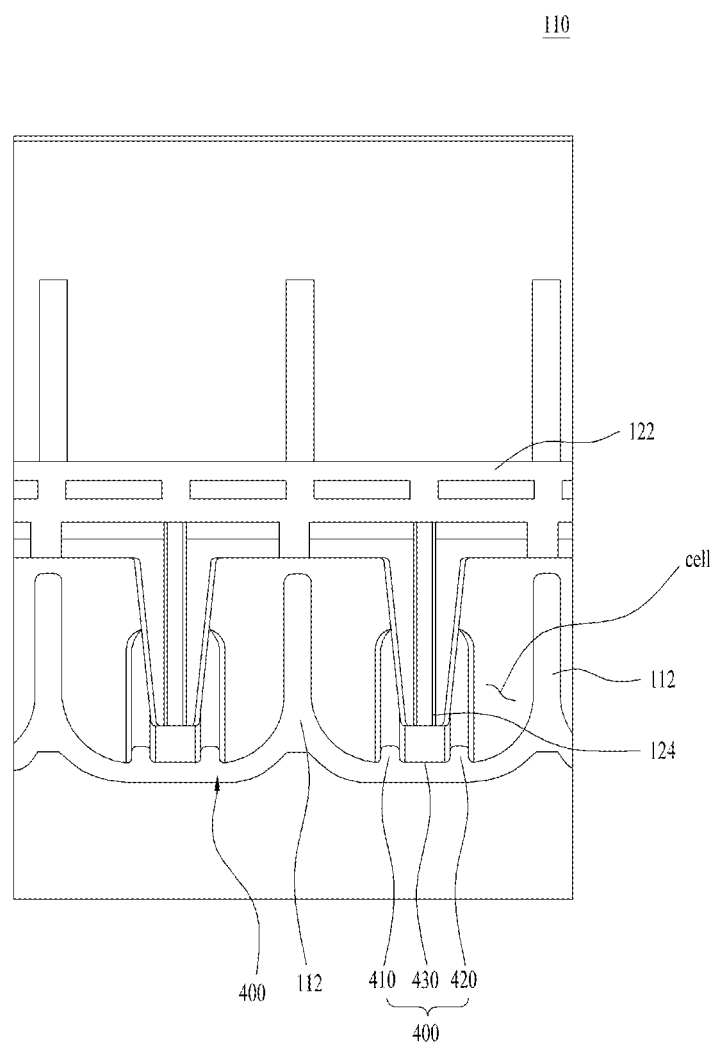
FIG. 11 is a view illustrating an example of a front cross-section of FIG. 10.

Referring to FIG. 11, the protrusion portion 400 includes a first protrusion 410 and a second protrusion 420, which are spaced apart from each other at a certain interval. A recess 430 is recessed between the first protrusion 410 and the second protrusion 420. The recess 430 may not be more recessed than the other portion of the bottom surface of the cell. That is, the recess 430 may be arranged to have a height lower than that of the upper end of the protrusion portion 400.

The distance between the first protrusion 410 and the second protrusion 420 may be greater than the width of the protrusion pin 124. If the protrusion pin 124 is rotated to rotate the ice, the protrusion pin 124 passes between the first protrusion 410 and the second protrusion 420. To increase a contact area of the protrusion pin 124 with the ice when the protrusion pin 124 moves the ice in contact with the ice, one end of the protrusion pin 124 may downwardly extend to a height lower than the upper end of the protrusion portion 400. In this case, if the protrusion portion 400 interrupts movement of the protrusion pin 124, the ice cannot be discharged smoothly. Therefore, the protrusion pin 124 may not be in contact with the protrusion portion 400.

One end of the protrusion pin 124 is extended to be arranged between the protruded height of the protrusion portion 400 and the bottom surface of the cell. That is, one end of the protrusion pin 124 is extended to be arranged between the upper end of the protrusion portion 400 and the bottom surface of the recess 430.

In the protrusion pin 124, a portion close to the rotary shaft 122 has a relatively wide width, whereas a portion far away from the rotary shaft 122 may have a relatively narrow width. Therefore, when the protrusion pin 124 pushes the ice, the protrusion pin 124 may stably transfer the rotation force of the ejector to the ice.

Referring to FIG. 10, the protrusion portion 400 may have an arc shape along an inner shape of the cell. That is, the protrusion portion 400 may be formed to make an arc along the bottom surface of the cell.

Extended heights at both ends of the protrusion portion 400 in the cell may be different from each other. That is, the protrusion portion 400 is arranged such that an angle of a start position based on a circle is asymmetrical to an angle of an end position based on the circle.

One end 400a of the protrusion portion 400 may be extended to be higher than the maximum water level of water supplied to the cell. A water supply valve for supplying water to the cell is controlled by a controller such that the amount of water supplied to the cell may not exceed the maximum water level. At this time, the controller may measure the amount of water by a flow rate sensor that passes through the water supply valve.

Therefore, one end 400a of the protrusion portion 400 is arranged to be higher than the ice frozen in the cell. In this case, the ice may be prevented from failing to move due to the protrusion portion 400 in which the ice is hung when the protrusion pin 124 rotates the ice in contact with the ice in an area adjacent to 'c' to move the ice. That is, since the ice of a portion adjacent to 'c' is frozen while having the shape of the protrusion portion 400, the ice is not hung in the protrusion portion 400.

In some implementations, the portion 'c' may be a portion where the protrusion pin 124 starts to be rotated in contact with the ice to discharge the ice from the ice tray 110. In FIG. 10, the protrusion pin 124 is rotated counterclockwise to discharge the ice.

The other end 400b of the protrusion portion 400 may be extended to be lower than the maximum water level of water supplied to the cell. That is, the other end 400b of the protrusion portion 400 is extended to a height lower than one end 400a of the protrusion portion 400.

In some examples, the other end 400b of the protrusion portion 400 may be extended to be lower than the normal water level of water supplied to the cell. That is, the other end 400b of the protrusion portion 400 is extended to a height lower than one end 400a of the protrusion portion 400.

In the portion adjacent to the protrusion portion 400 is extended to a height lower than the portion adjacent to 'c'. At this time, the portion adjacent to 'b' may be an opposite portion of a portion where the protrusion pin 124 starts to be rotated in contact with the ice to discharge the ice from the ice tray 110.

Figure 9:
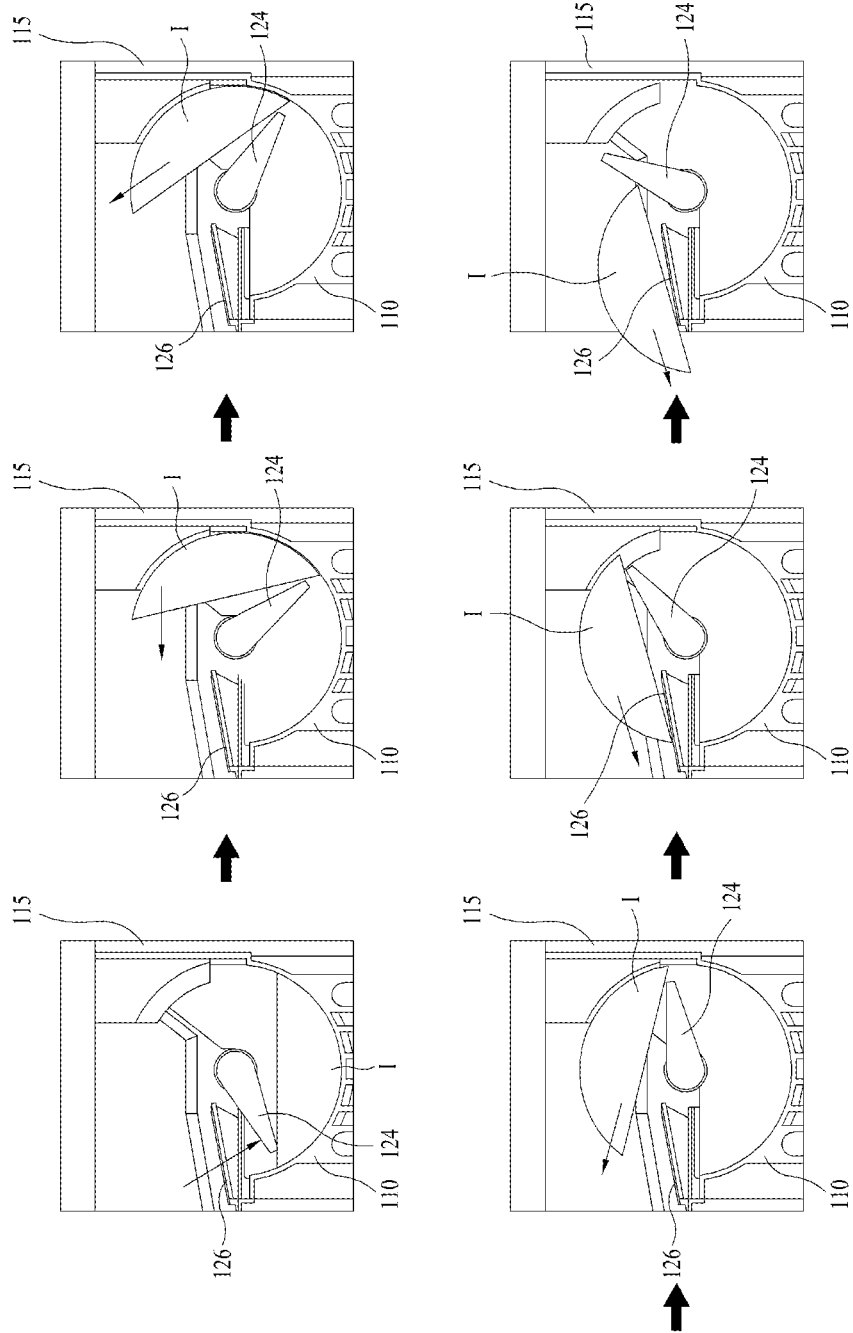
FIG. 9 is a view illustrating an example process to discharge ice.

When the protrusion pin 124 pushes the ice and then reaches the position of 'b' based on FIG. 10, the ice may be discharged to the portion 'd' by self-load after ascending to the upper side of the discharge guide 126 (see FIGS. 3 and 9). The discharge guide 126 has one side inclined to discharge the ice, and a center of gravity of the ice may be arranged in an inclined direction to smoothly discharge the ice.

In some implementations, since the portion adjacent to 'c' is a portion positioned at the front of rotation and movement of the ice, a volume occupied by the protrusion portion 400 in the cell is reduced, and a volume occupied by water is increased. Therefore, the volume of the ice is more increased in the portion adjacent to 'c' in the cell than the portion adjacent to 'b', and the center of gravity of the ice when the ice moves is arranged in the portion where water is frozen in the portion adjacent to 'c'. Therefore, since the ice may easily move through the discharge guide 126, reliability of ice discharge may be improved.

In some implementations, the upper end of the protrusion portion 400 may be rounded to constitute a curve. Since the portion where the ice tray 110 is in contact with the ice is formed to be rounded, friction that may occur when the ice moves from the ice tray may be reduced.

Figure 12:
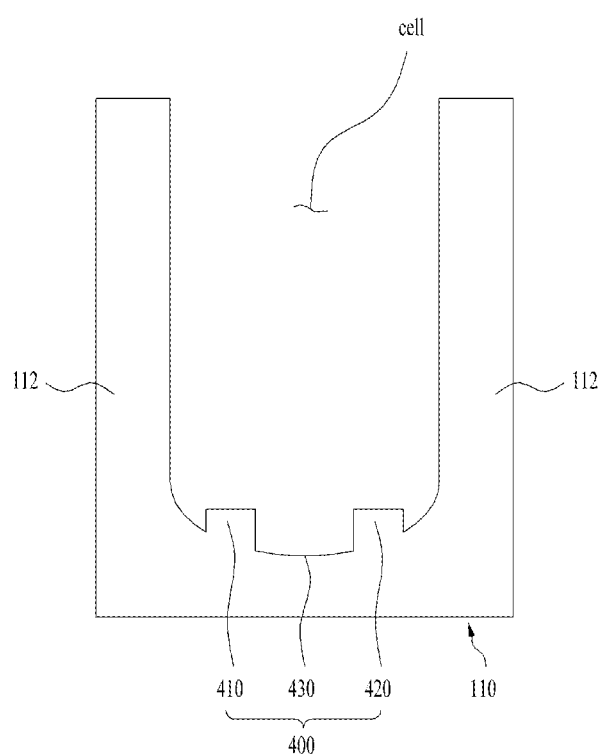
FIGS. 12 and 13 are views illustrating examples of FIG. 11.
Figure 13:
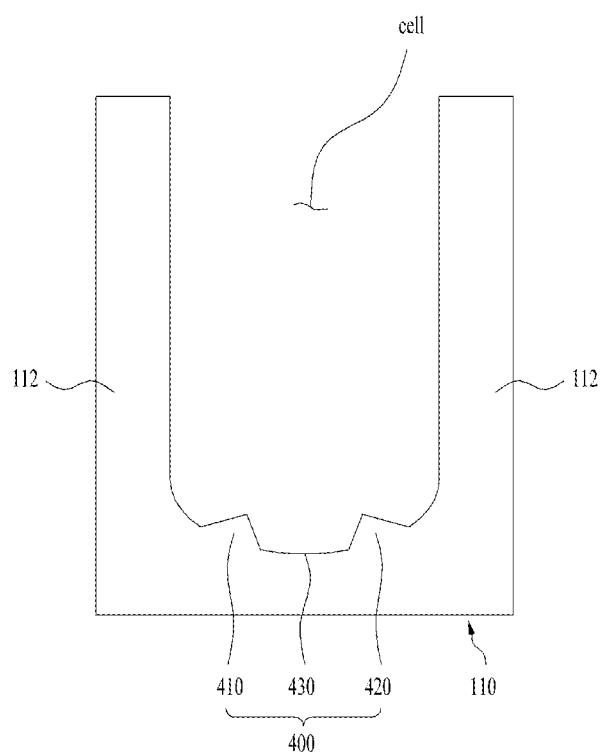

FIGS. 12 and 13 illustrate examples of FIG. 11.

As shown in FIG. 12, the upper end of the protrusion portion 400 may be angulated. In some examples, as shown in FIG. 13, the upper end of the protrusion portion 400 may be formed to constitute a flat surface. The protrusion portion 400 may be formed in a shape that may be protruded into the cell to increase a contact area with water. In some examples, the protrusion portion 400 may have a shape that does not increase resistance greatly when the ice moves inside the cell.

Figure 14:
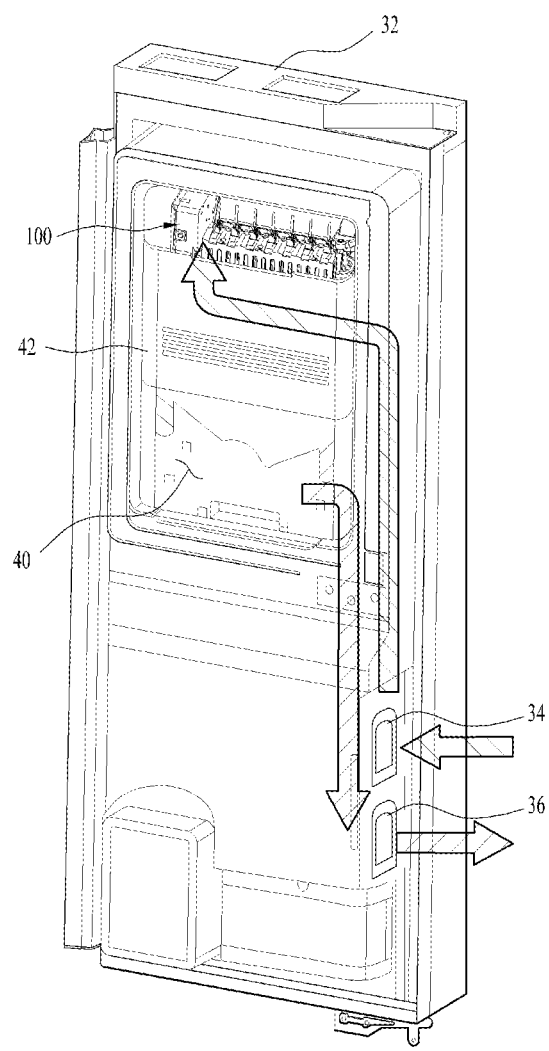
FIG. 14 is a view illustrating an example of a door including an ice maker.
Figure 15:
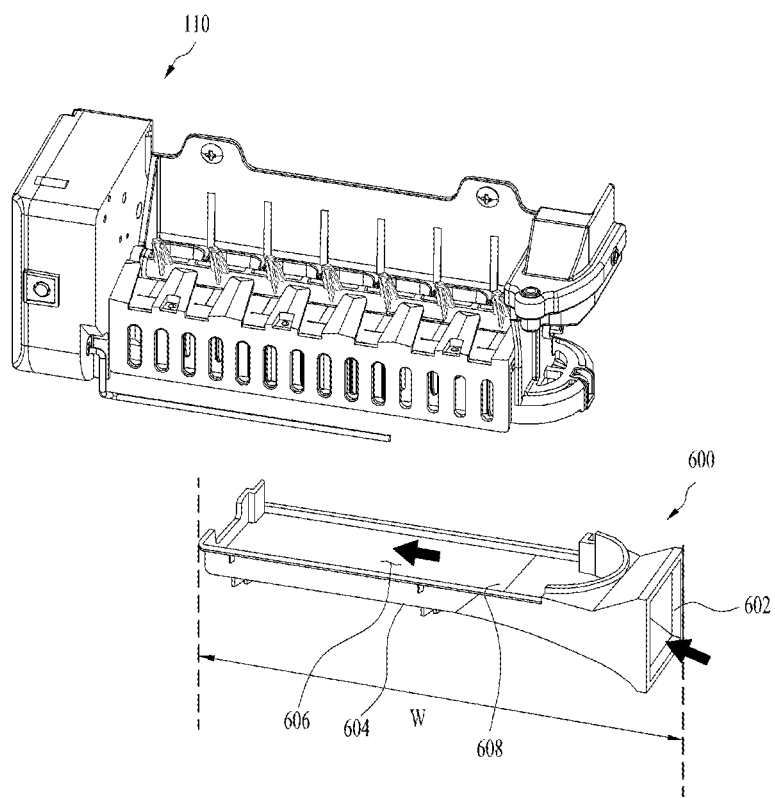
FIG. 15 is a view illustrating an example main portion of FIG. 14.

FIG. 14 illustrates an example of a door provided with an ice maker, and FIG. 15 is a view illustrating a main portion in FIG. 14.

The ice making compartment 40, which may generate ice to provide a user with the ice, is provided inside the refrigerating compartment door 32.

The ice maker 100, which may form ice, is provided at the upper side of the ice making compartment 40, and the ice bank 42, in which the ice pieces discharged from the ice maker 100 are received, is provided at the lower portion of the ice maker 100.

In some implementations, an inlet 34 to which the cool air from the evaporator provided in the cabinet of the refrigerator is transferred is formed at one side of the door 32. If the inlet 34 is in contact with a cool air discharge outlet provided in the cabinet, the cool air supplied from the cabinet may be supplied to the inlet 34.

The cool air supplied through the inlet 34 may be supplied to the ice maker 100 and cool the water received in the ice tray 110 after passing through a cool air supply duct provided in the refrigerator compartment door 32.

In some implementations, the cool air discharged from the ice maker 100 is guided to a discharge outlet 36 after passing through the ice bank 42 and then passing through a cool air discharge duct provided in the refrigerating compartment door 32. Since the air discharged from the discharge outlet 36 is in contact with a cool air collecting hole provided in the cabinet, the air may again be guided to the evaporator provided in the cabinet.

The ice making compartment 40 may need to maintain a temperature below zero to form ice, while the refrigerating compartment may maintain a temperature above zero in which the refrigerating compartment door 32 may open and close. Therefore, air supplied to the ice making compartment 40 or discharged from the ice making compartment 40 should not be discharged to the refrigerating compartment.

In some implementations, a path that may move through the inlet 34 and the discharge outlet 36 is formed such that the cool air supplied to the refrigerating compartment door 32 and the cool air discharged from the refrigerating compartment door 32 may not leak to the storage compartment.

In some implantations, the cool air supplied to the refrigerating compartment door 32 through the inlet 34 is guided to the upper side of the refrigerating compartment door 32. On the other hand, the cool air which has passed through the ice maker 100 is guided from the inside of the refrigerating compartment door 32 to the lower side of the refrigerating compartment door 32, whereby the cool air may be discharged through the discharge outlet 36.

As shown in FIG. 15, a cool air guide 600 for supplying the cool air to the lower portion of the ice maker 100 is provided at the lower portion of the ice maker 100. An inlet 602 to which the cool air from the cool air supply duct provided inside the refrigerating compartment door 32 is transferred is provided at one side of the cool air guide 600.

The cool air guide 600 is provided with a body 604 for guiding a path of the cool air, and the inlet 602 is arranged at the right side (based on FIG. 15) of the body 604 and thus the cool air is guided from the body 604 in a left direction.

The body 604 includes a bottom surface 608, of which upper side is provided with an opening portion 606, whereby the cool air may be discharged toward the opening 606 without moving to the lower portion of the body 604.

The bottom surface 608 is extended to be shorter than the width of the ice maker 100. The cool air guided through the cool air guide 600 moves to the portion where the bottom surface 608 is formed, relatively stably in a left direction. However, if the cool air gets out of the portion where the bottom surface 608 is formed, the cool air moves relatively freely. Therefore, the cool air moves at a portion where the cool air gets out of the bottom surface 608, in various directions, whereby the cool air may get out of resistance from the bottom surface 608.

Figure 16:
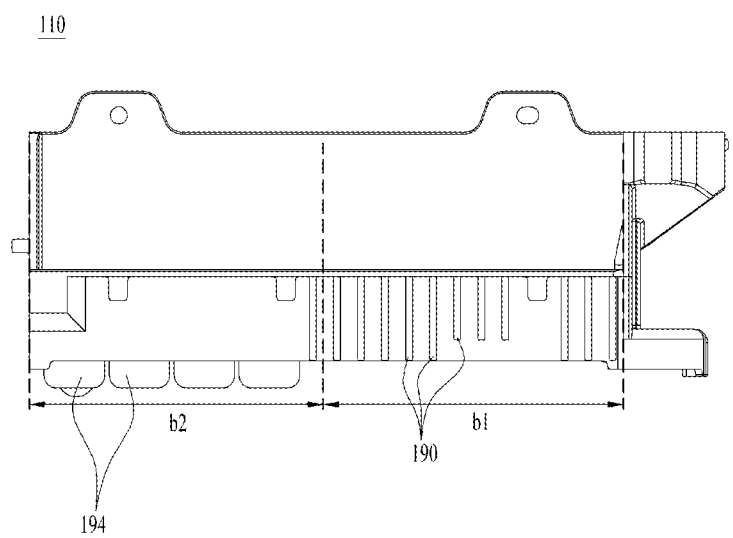
FIG. 16 is a view illustrating an example ice tray viewed from the front.
Figure 17:
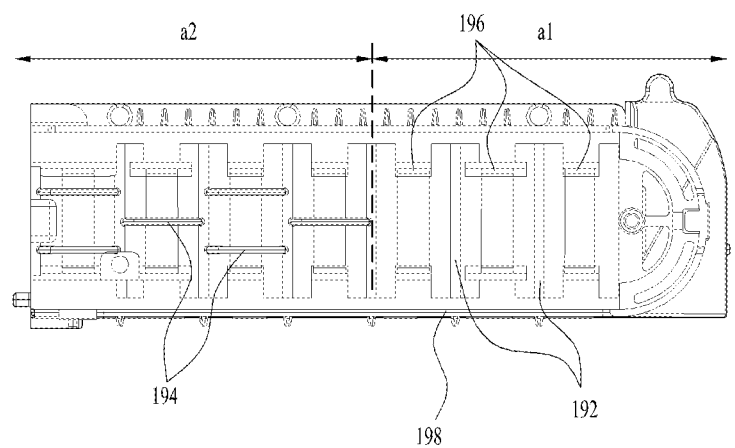
FIG. 17 is a view illustrating an example lower portion of an example ice tray.
Figure 18:
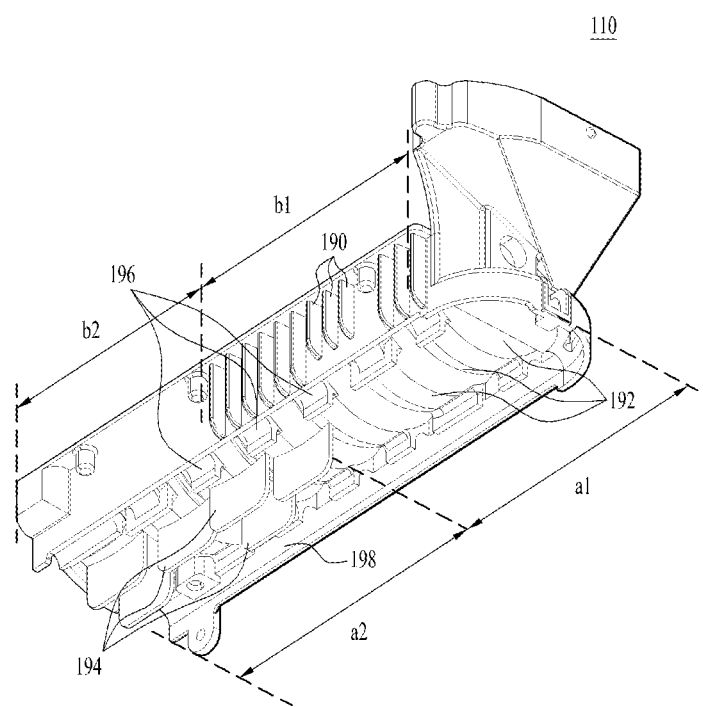
FIG. 18 is a view illustrating an example ice tray viewed from a lower side.

FIG. 16 illustrates an example ice tray viewed from the front, FIG. 17 illustrates a lower portion of an example ice tray, and FIG. 18 illustrates an example ice tray viewed from a lower side.

In FIGS. 16 and 17, arrows represent a brief moving direction of the cool air supplied form the cool air guide 600.

When the ice tray 110 is heated for ice separation, pins of the ice tray 110 are excessively increased, an electric heating area is increased, and a heating time is increased due to increase of heat capacity of the ice tray 110. This may cause reduction of ice making amount, increase of ice making power consumption, and quality deterioration of ice pieces due to melting of ice caused by heating of the heater. That is, since a heat transfer coefficient 'ha' for increase of ice making heat transfer amount is increased if a pressure drop amount on a cool air path is small, reckless pin attachment of the ice tray 110 may cause reduction of ice making air volume.

In this implementation, a method for discharging the cool air to a front surface of the ice tray 110 by allowing the cool air to enter a right side of the ice maker 100 and performing heat transfer from lower and front surfaces of the ice tray 110 is adopted. To increase ice making performance (ice making heat transfer amount) in the ice maker, pins are arranged for an electric heating area of the ice tray 110 and the cool air. However, if the pins are excessively arranged for increase of the electric heating area, a heating time for ice separation is increased due to increase of heat capacity according to increase of a total mass of the ice tray 110, whereby ice making heat transfer efficiency is reduced. In some examples, a pressure drop amount of an ice making path is increased in accordance with arrangement of the pins, whereby heat transfer efficiency may be reduced. Therefore, in this implementation, the technology of lower and front surfaces of the ice tray has been devised considering the aforementioned technical restrictions.

In this implementation, cool air for ice making may enter the ice tray 110 from the left side, cool the lower end of the ice tray 110, and then be discharged to the front surface of the ice tray 110. In some examples, since the driving device 150 for rotation of the ejector 120 exists at the left side of the ice tray, the path may be blocked, whereby vortex may occur at the lower end of the ice tray 110. Therefore, to minimize the vortex, the pins may be removed from a certain area of the front surface, whereby efficiency in trade-off between the electric heating area and pressure drop is increased.

In case of the lower end of the ice tray 110, a lot of heat transfer of the cool air occurs at the right side of the ice tray 110, the right side of the ice tray 110 has the lowest temperature, whereas heat transfer is reduced at the left side of the ice tray 110 due to flow speed reduction and air temperature increase. Therefore, it is effective to arrange lower pins of the ice tray 110 at only a certain area. In some examples, staggered arrangement not in-line arrangement is applied to arrangement of the pins.

A first guide rib 192, for heat exchange with the cool air supplied from the cool air guide 600, a second guide rib 194 and a third guide rib 196 are arranged at the lower portion of the ice tray 110.

The first guide rib 192 is arranged to be extended in a forward and backward direction with respect to the ice tray 110 and thus arranged to be vertical to the cool air supplied from the cool air guide 600 in a left direction. In some examples, the first guide rib 192 is downwardly protruded with respect to the ice tray 110, whereby a contact area of the ice tray 110 with the cool air may be increased through the first guide rib 192 to quickly generate ice pieces.

The second guide rib 194 is arranged to be extended in a left and right direction with respect to the ice tray 110 and thus arranged to be parallel with the cool air supplied from the cool air guide 600 in a left and right direction. In some examples, the second guide rib 194 is downwardly protruded with respect to the ice tray 110, whereby the contact area of the ice tray 110 with the cool air may be increased through the second guide rib 194 to quickly generate ice pieces.

In some examples, the second guide rib 194 may be arranged at the center of the lower portion of the ice tray 110 to guide a moving direction of the cool air supplied from the cool air guide 600.

In some implementations, the lower portion of the ice tray 110 may be categorized into a first area a1 arranged to adjoin the cool air guide 600 and a second area a2 arranged to be far away from the cool air guide 600.

Since the first area a1 is arranged to be close to the cool air guide 600, the first area a1 is a portion where a relatively fast speed of the cool air supplied from the cool air guide 600 is maintained. On the other hand, since the second area a2 is arranged to be far away from the cool air guide 600, the second area a2 is a portion where the speed of the cool air supplied from the cool air guide 600 relatively becomes slow. If there are a lot of projected portions in the ice tray 110, since the contact area of the ice tray 110 with the cool air is increased, it is advantageous in that heat exchange efficiency is increased, whereas a drawback occurs in that friction with the air is increased to make the moving speed of the air slow.

Therefore, in the area of a1, the second guide rib 194 is not provided, and the cool air is maintained at a relatively fast speed to easily move the cool air to the area of a2. On the other hand, since the speed of the cool air is lowered in the area of a2, the second guide rib 194 is provided to have more contact areas.

In some implementations, the second guide rib 194 is arranged to be parallel with a left direction, to which the cool air moves, such that the moving speed of the cool air does not become slow if possible.

The third guide rib 196 is arranged to be extended in a left and right direction with respect to the ice tray 110 and arranged at lower corners of the ice tray 110. The third guide rib 196 may form a lower outside of the ice tray 110.

At this time, a barrier 198 is provided at the rear of the ice tray 110. The barrier 198 may be arranged to be spaced apart from the third guide rib 196.

The heater 140 may be arranged between the barrier 198 and the third guide rib 196.

The third guide rib 196 guides the cool air to stay in the lower portion of the ice tray 110, whereby a heat exchange time of the cool air with the ice tray 110 may be increased.

The third guide rib 196 may be arranged at both ends of the first guide rib 192. That is, the third guide rib 196 may be arranged at a portion where the first guide rib 192 ends.

Each of the first guide rib 192 and the third guide rib 196 may be arranged as a plurality of the same. The third guide ribs 196 may be arranged to connect the first guide ribs 192 in a line. Therefore, the time when the cool air stays in the lower portion of the ice tray 110 is increased, whereby ice making efficiency may be improved.

The respective third guide ribs 196 may be arranged to be spaced apart from each other in a left and right direction. Since the portion where the heater 140 is arranged may partially be exposed between the third guide ribs 196, the heater 140 may be cooled together with the third guide ribs 196.

The plurality of first guide ribs 192 may be arranged, and the respective first guide ribs 192 may be arranged at the same interval. At this time, the second guide rib 194 may be arranged to connect two of the first guide ribs 192 to guide a flow of the cool air.

Particularly, the second guide rib 194 may be formed to be more protruded downwardly than the first guide rib 192, and thus may guide the cool air in a certain direction while increasing the contact area with the cool air.

The second guide rib 194 may be arranged as a plurality of the same, and the respective second guide ribs 194 may be arranged alternately. Since the second guide ribs 194 are formed to be more protruded downwardly than the first guide rib 192, it may be difficult for the cool air to move in a forward and backward direction between the second guide ribs 194. Therefore, to enhance freedom of degree in the moving direction of the cool air, the second guide ribs 194 are arranged in staggered arrangement not in-line arrangement.

Fourth guide ribs 190 are provided on a front surface (see FIG. 16) of the ice tray 110 and protruded to be extended in an up and down direction. The fourth guide ribs 190 are arranged in a third area b1 arranged to adjoin the cool air guide 600 in the ice tray 110.

On the other hand, on the front surface of the ice tray 110, a fourth area b2 arranged to be far away from the cool air guide 600 may have a flat shape. That is, since the fourth guide ribs 190 are not arranged in the fourth area b2, the fourth area b2 may constitute one surface.

The moving speed of the cool air is relatively fast in the third area b1 adjacent to the cool air guide 600 on the front surface of the ice tray 110, whereas the moving speed of the cool air becomes slow in the fourth area b2 far away from the cool air guide 600.

Therefore, the fourth guide ribs 190 are provided in the third area b1 to increase a heat exchange area with the cool air. On the other hand, the fourth area b2 may be formed as a flat surface, whereby the cool air may pass through the fourth area b2 without any delay.

In some implementations, since some of the fourth guide ribs 190 are extended at different lengths to guide the cool air in various directions not a uniform direction.

The portion where the first area a1 and the second area a2 are divided from each other may be the same as or different from the portion where the third area b1 and the fourth area b2 are divided from each other.

The cool air guide 600 is arranged below the ice tray 110, and the air guide 166 is arranged on the front surface of the ice tray 110 (see FIGS. 2 and 3). Although the air guide 166 is provided with the cool air discharge holes 169, the space between the ice tray 110 and the air guide 166 is smaller than the lower space of the ice tray 110. Therefore, based on that it is more difficult for the cool air to move on the front surface of the ice tray 110 than the lower portion of the ice tray 110, less guide ribs are arranged on the front surface than the lower portion to improve heat exchange efficiency between the cool air and the ice tray.

Figure 19:
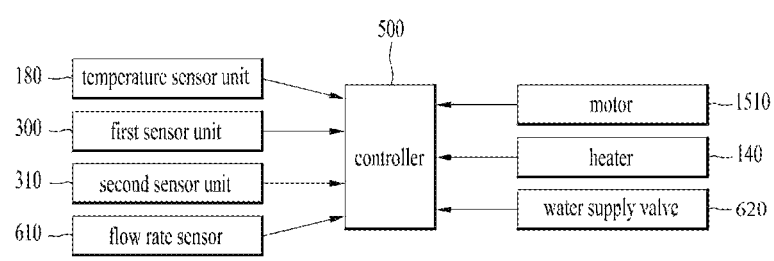
FIG. 19 is a control block diagram for controlling an example ice maker.

FIG. 19 is a control block diagram illustrating an example implementation. Description will be given with reference to FIG. 19.

In the present disclosure, a controller 500 receives information from various elements and transfers a related command in accordance with the received information. The controller 500 may be provided in the circuit board 1580 of the ice maker 100.

Unlike the above case, to concisely maintain the circuit board 1580, the controller may be a controller for controlling the refrigerator. In this case, the controller 500 may together perform a function of driving a compressor for compressing a refrigerant, a function of transferring a related signal to a display provided in a door, and a function of transmitting and receiving a signal between an external communication network and the refrigerator.

Description will be given based on that the present disclosure is applicable to both the aforementioned two examples (the example that the controller is provided in the circuit board and the example that the controller corresponds to a main controller of the refrigerator).

The controller 500 receives information on a temperature from the temperature sensor unit 180. The controller 500 may determine whether the ice tray 110 has been sufficiently cooled, and may determine whether ice has been formed in the ice tray 110 in accordance with the sensed temperature.

The first sensor unit 300 may sense movement of the first rotation member in accordance with rotation of the ejector rotation gear. To this end, the first sensor unit 300 may include a first hall sensor 1536 as shown in FIGS. 7A to 7C. The first hall sensor 1536 may sense a change of a magnetic force if the first rotation member moves, and therefore may sense rotation of the ejector. Therefore, the controller 500 may sense a rotation angle of the ejector 120 by the first sensor unit 300.

The second sensor unit 310 may sense movement of the second rotation member in accordance with rotation of the ejector rotation gear. To this end, the second sensor unit 310 may include a second hall sensor 1566 as shown in FIGS. 8A and 8B. The second hall sensor 1566 may sense a change of a magnetic force if the full-ice sensing bar rotation gear 1560 moves together with the second rotation member, and therefore may sense rotation of the full-ice sensing bar rotation gear 1560. Therefore, the controller 500 may sense whether ice pieces are stacked at a set amount or more, by the second sensor unit 310.

A flow rate sensor 610 may sense the amount of water supplied to the ice tray 110. Therefore, the controller 500 may sense the amount of water supplied to the ice tray 110 in accordance with a signal received from the flow rate sensor 610.

The controller 500 may command the motor 1510 to perform a forward rotation or backward rotation. That is, the motor 1510 may rotate the ejector rotation gear clockwise or counterclockwise in accordance with the signal of the controller 500.

The controller 500 may turn on or off the heater 140. The controller 500 may heat the ice tray 110 by turning on the heater 140 in accordance with the rotation angle of the ejector. In some examples, the controller 500 may stop supply of heat to the ice tray 110 by turning off the heater 140 in accordance with the rotation angle of the ejector.

The controller 500 may open or close the water supply valve 620 for opening or closing the path where water is supplied to the ice tray 110 in accordance with flow rate information received from the flow rate sensor 610. If the water supply valve 620 opens the path, water may be supplied to the ice tray 110, and if the water supply valve closes the path, water is not supplied to the ice tray 110.

Figure 20A:
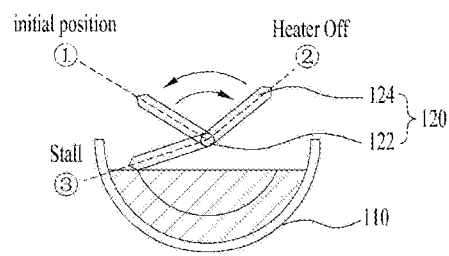
FIGS. 20A and 20B are views illustrating example rotation paths of example ejectors.
Figure 20B:
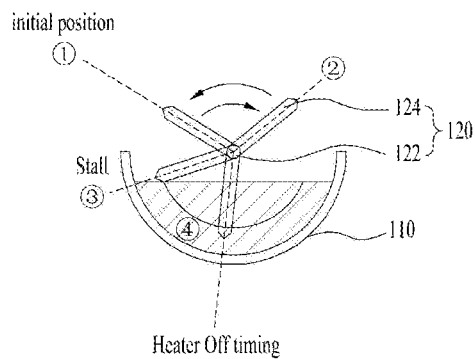
Figure 21A:
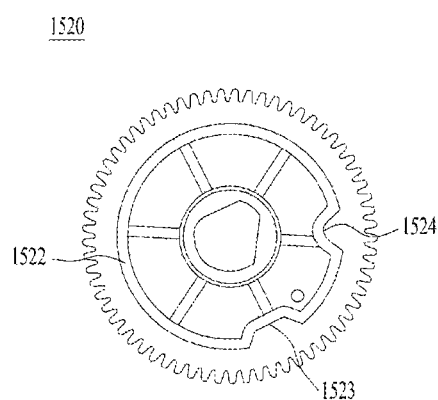
FIGS. 21A and 21B are views illustrating example ejector rotation gears.
Figure 21B:
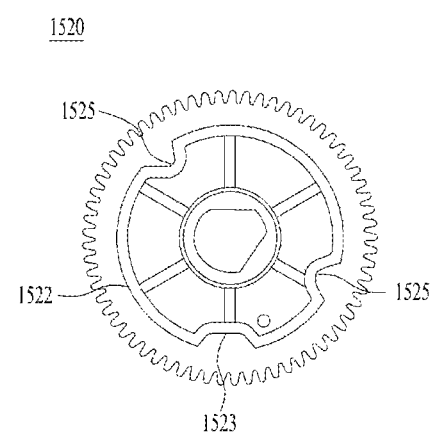

FIGS. 20A and 20B illustrate an example rotation path of an example ejector. FIGS. 21A and 21B illustrate an example ejector rotation gear.

FIG. 20A illustrates that an implementation described with reference to FIGS. 4 to 8B, and FIG. 20B illustrates a method implemented in accordance with another implementation. Likewise, rotation according to FIG. 20A may be implemented by an operation of the ejector rotation gear shown in FIG. 21A, and rotation according to FIG. 20B may be implemented by the ejector rotation gear shown in FIG. 21B.

The implementation according to FIGS. 20A and 21A will be described. If ice making is completed in the ice tray 110, the ejector 120 is rotated from the first position to the second position counterclockwise to identify full-ice of the ice bank 42. At this time, although the protrusion pin 124 is rotated together with the ejector 120, the full-ice sensing bar rotation gear 1560 is substantially rotated to sense full-ice.

In this case, as the ejector rotation gear 1520 shown in FIG. 21A is rotated clockwise, and the first rotation member 1530 is hung in the second groove 1524. Therefore, the first sensor unit 300 may sense movement of the first rotation member 1530, and may finally sense that the protrusion pin 124 moves to the second position.

Subsequently, the controller 500 provides a rotation force of the motor 1510 rotated counterclockwise, whereby the ejector 120 is rotated counterclockwise. That is, the protrusion pin 124 moves from the second position to the first position. Likewise, since the first rotation member 1530 is hung in the first groove 1523, the first sensor unit 300 may sense movement of the first rotation member 1530, and may finally sense that the protrusion pin 124 moves to the first position. The first position may be the initial position.

At the first position, if a certain time passes after the heater 140 is turned on, the protrusion pin 124 moves to the third position counterclockwise due to the rotation force of the motor 1510. The protrusion pin 124 continues to push the ice until the surface of the ice is melted and then the ice moves. If the surface of the ice is melted and the ice moves after a certain time passes, the protrusion pin 124 moves by continuously pushing the ice. Even at this time, the heater 140 is continuously driven, and heats the ice tray 110. If the heater 140 is driven, since a current is supplied to the heater 140, the heater 140 consumes energy.

If the protrusion pin 124 pushes the ice while being rotated counterclockwise and finally reach the second position, the heater 140 is turned off. That is, no current is supplied to the heater 140, and energy consumption is stopped.

Subsequently, if the protrusion pin 124 reaches the first position while being rotated counterclockwise, it is determined that ice separation of the ice tray 110 is completed.

Unlike the implementation according to FIGS. 20A and 21A, the first cam portion 1522 of the ejector rotation gear is additionally provided with a third groove 1525 in the implementation according to FIGS. 20B and 21B. That is, the first cam portion 1522 are provided with the first groove 1523, the second groove 1524 and the third groove 1525.

If the first rotation member 1530 is hung in each of the first, second and third grooves 1523, 1524 and 1525, the first sensor unit 300 senses a position change of the first rotation member 1530. Therefore, the first sensor unit 300 may sense how the ejector 120, that is, the protrusion pin 124 is rotated to reach the current position and an angle at the current position.

In this implementation, the ejector rotation gear 1520 is rotated from the first position to the second position in the same manner as the implementation of FIGS. 20A and 21A to sense full-ice. Therefore, the protrusion pin is rotated from the first position to the second position clockwise.

If the ice pieces are stacked in the ice bank 42 at a height lower than the set height, the ejector 120 is rotated counterclockwise. The protrusion pin 124 moves from the second position to the first position, and continue to be rotated counterclockwise and then move to the third position.

At this time, the first sensor unit 300 senses the time when the first rotation member 1530 is hung in the first groove 1523 (when the first rotation member 1530 reaches the first position), whereby the heater 140 is turned on at the corresponding time.

If the protrusion pin 124 is rotated counterclockwise to reach the third position and continuously push the ice, the ice starts to move by operation of the protrusion pin 124.

In some implementations, if the protrusion pin 124 continues to be rotated counterclockwise, the ice move and the protrusion pin 124 reaches the fourth position. If the ice moves to the fourth position, the ice is substantially separated from the ice tray 110, whereby the ice may move by rotation force of the protrusion pin 124 even though heat is not supplied from the heater 140.

The time when the protrusion pin 124 reaches the fourth position is the same as the time when the first rotation member 1530 is hung in the third groove 1525. That is, if the ejector rotation gear 1520 continues to be rotated counterclockwise, the ejector, that is, the protrusion pin 124 is rotated counterclockwise together with the ejector rotation gear 1520. If the first rotation member 1530 is hung in the third groove 1525, the first rotation member 1530 moves, and the first sensor unit 300 may sense the corresponding time.

The controller 500 may determine that the heater 140 does not need to supply heat because the protrusion pin 124 sufficiently pushes the ice at the corresponding time, and may turn off the heater 140, whereby energy may be saved.

In the implementation of FIGS. 20B and 21B, the heater 140 is turned off at an earlier time as compared with the implementation of FIGS. 20A and 21A. That is, power consumption in the heater 140 may be reduced. If the power consumed by the heater 140 is increased, more energy is consumed to cool the ice tray 110 again to generate ice since the ice tray 110 is also heated by a high temperature.

In the implementation of FIGS. 20B and 21B, energy consumed by the heater and energy consumed to cool the ice tray may be reduced as compared with the implementation of FIGS. 20A and 21A. In some examples, in the implementation of FIGS. 20B and 21B, since the temperature of the ice tray is not increased as compared with the implementation of FIGS. 20A and 21A, the ice tray may be cooled more quickly. Therefore, since the time required to form the ice may be reduced, the amount of the ice that may be provided to the user may be increased.

A structure that the position (the position of the protrusion pin 124 between 0° and 90°) where the ejector starts to move from the third position may be sensed is applied to the implementation of FIGS. 20A and 21A, and the heater 140 may be turned off relatively quickly.

Generally, for ice separation from the ice tray 110, the heater 140 at the lower end of the ice tray 110 is used. If the protrusion pin 124 starts to move the ice beyond the third position, since the surface of the ice is melted even though the heater 140 is turned off, ice separation may be performed.

Figure 22:
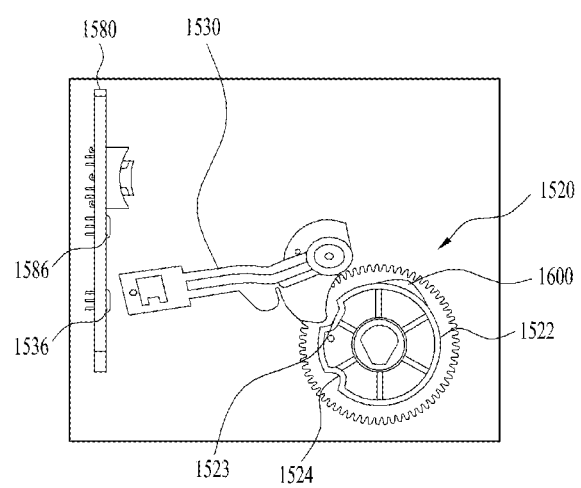
FIG. 22 is a view illustrating another example ejector rotation gear.

FIG. 22 is a view illustrating another implementation of an ejector rotation gear.

Referring to FIG. 22, the ejector rotation gear 1520 includes the first groove 1523, the third groove 1524 and a protrusion 1600 on the outer circumference of the first cam portion 1522.

The initial position of the ejector is sensed by movement of the first rotation member 1530, which is generated in the first groove 1523, and a full-ice position is sensed by movement of the first rotation member 1530, which is generated in the second groove 1524.

On the other hand, the time when the heater 140 is turned off is sensed by movement of the first rotation member 1530, which is generated in the protrusion 1600.

If the first rotation member 1530 is hung in the first groove 1523 and the second groove 1524, a position change of the first rotation member 1530 is sensed by the first hall sensor 1536 of the first sensor unit 300.

The first sensor unit 300 further includes a third hall sensor 1586 packaged in the circuit board 1580. The third hall sensor 1586 is arranged above the first hall sensor 1536.

If the first rotation member 1530 is hung in the protrusion 1600, since the first rotation member ascends, the third hall sensor 1586 may sense movement of the first rotation member 1530.

That is, in this implementation, it is designed such that the protrusion 1600 is added to allow the first rotation member 1530 to ascend. The first sensor unit 300 may sense whether the ejector has reached the initial position, by operation of the first hall sensor 1536, and may sense whether the ejector has reached the position where the heater may be turned off, by operation of the third hall sensor 1586.

In this implementation, since the first sensor unit includes two hall sensors, a first group of the initial position and the full-ice position may be identified from a second group of a position where the heater may be turned off.

In addition, in another implementation, the off-time of the heater 140 may be determined by measurement of the current supplied to the motor 1510. Since the ice does not move initially at the third position corresponding to the time when the protrusion pin 124 is rotated to reach the ice, stall occurs, and a current value supplied to the motor 1510 is increased. If the ice starts to move, stall is released and the protrusion pin 124 is rotated, and a current value consumed by the motor 1510 is reduced. The time when the current consumed by the motor 1510 is determined, and it is determined at that time that ice separation may be performed even though heat is not additionally supplied from the heater, whereby the heater may be turned off.

That is, the first sensor unit 300 may sense the angle of the protrusion pin 124 before the ice formed in the ice tray 110 is completely discharged from the ice tray 110. The first sensor unit 300 may sense whether the ice passes through a specific position of a rotation track of the protrusion pin 124 even before the ice is completely discharged, by sensing whether the protrusion pin 124 have reached a specific angle. In some examples, the heater 140 may be turned off at the angle sensed by the first sensor unit 300. That is, since the heater 140 may be turned off before the ice is completely discharge from the ice tray 110, energy consumed for driving the ice maker may be saved.

In some implementations, the first sensor unit 300 may sense whether the protrusion pin 124 has reached an angle before the ice ascends to the discharge guide 126, and may turn off the heater 140 at the corresponding angle. After the ice ascends to the discharge guide 126, the ice may be dropped along a slope of the discharge guide 126 and stored in the ice bank 42.

In some examples, the first sensor unit 300 may sense whether the protrusion pin 124 has reached an angle where the ice formed by the ice tray is rotated by 90° or less, thereby turning off the heater 140 at the corresponding angle. Since the ice may move from the ice tray in a state in which the ice is rotated at 90° or less, the ice may move without melting by additionally supplying heat from the heater 140.

The first sensor unit 300 may sense whether the protrusion pin 124 has reached an angle before the protrusion pin 124 is arranged to be vertical to the ground after being in contact with the ice formed by the ice tray, and thus may turn off the heater 140 if the protrusion pin 124 reaches the corresponding angle. Since the time when the heater is turned off may become faster, energy consumed by the ice maker may be saved, and the time required to cool the ice maker may be saved.

In some examples, the first sensor unit 300 may sense whether the protrusion pin 124 has reached an angle for moving the ice formed by the ice tray 110 at a certain angle, and thus may turn off the heater 140 at the corresponding angle.

The first sensor unit 300 may sense whether the protrusion pin 124 has moved the ice formed by the ice tray at a predetermined angle after the heater 140 has been driven, and thus may turn off the heater 140.

The first sensor unit 300 may sense a first position, a second position and a third position according to the rotation angle of the protrusion pin 124, wherein the angle of the protrusion pin rotated at the first position, the second position and the third position are different from one another. In this case, if the protrusion pin 124 reaches the third position, the heater 140 may be turned off.

In some implementations, the first position may be the initial position where ice separation starts, the second position may be the position where full-ice of the ice bank is sensed, and the third position may be the position where the ice formed by the ice tray moves at a predetermined distance.

If the first sensor unit 300 senses that the protrusion pin 124 has reached the first position, the heater 140 is turned on, whereby ice separation may start.

Figure 23:
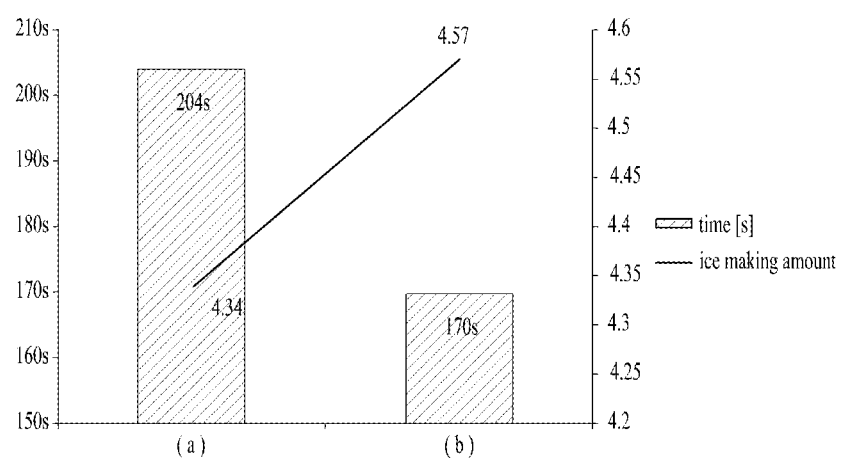
FIG. 23 is a view illustrating experimental results showing effects of the implementations described in FIGS. 20A to 21B.

FIG. 23 is a view illustrating an effect of the implementations described in FIGS. 20A to 21B.

The experimental result according to the implementation of FIGS. 20A and 21A is shown as (a) in FIG. 23, and the experimental result according to the implementation of FIGS. 20B and 21B is shown as (b) in FIG. 23.

In FIG. 23, a bar graph represents a heating time of the heater, and a line represents an ice making amount.

According to the experimental result of the implementation according to FIGS. 20B and 21B, additional heating of about 30 seconds may be avoided by the heater 140 as compared with the implementation according to FIGS. 20A and 20B. Therefore, it is noted that the heating time by the heater is reduced to 170 seconds.

As the time required for ice making is reduced, it is noted that the ice making amount is increased from 4.34 lb to 4.57 lb as much as 0.23 lb.

It will be apparent to those skilled in the art that the present disclosure may be embodied in other specific forms without departing from the spirit and essential characteristics of the disclosure. Thus, the above implementations are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. An ice maker comprising:
    an ice tray that is configured to receive water, the ice tray comprising a plurality of partition ribs that partition an inner space of the ice tray into a plurality of cells;
    an ejector that is configured to rotate relative to the ice tray, that is configured to cause rotation of ice pieces in a rotation direction relative to the ice tray, and that is configured to discharge the ice pieces from the ice tray; and
    a motor configured to drive the ejector to rotate in a first direction and a second direction opposite to the first direction,
    wherein the ice tray further comprises a protrusion portion that is located at each cell, that protrudes from a lower surface of each cell to increase a contact area between water and the ice tray, and that extends along the lower surface of each cell in a direction corresponding to the rotation direction of the ice pieces relative to the ice tray,
    wherein a vertical cross-section of the protrusion portion has a constant height with respect to the lower surface of each cell and extends in the direction corresponding to the rotation direction of the ice pieces, and
    wherein the protrusion portion is spaced apart from the plurality of partition ribs and configured to contact water accommodated in each cell.

2. The ice maker according to claim 1, wherein the lower surface of each cell has a curvature that is constant in the rotation direction of the ice pieces relative to the ice tray.

3. The ice maker according to claim 1, wherein the ejector comprises:
    a rotary shaft connected to the motor and configured to rotate about an axis that extends toward the motor; and protrusion pins that protrude radially outward from the rotary shaft toward the plurality of cells, respectively, each protrusion pin being configured to contact an ice piece in a corresponding cell of the plurality of cells.

4. The ice maker according to claim 3, wherein the protrusion portion comprises a first protrusion and a second protrusion that are spaced apart from each other.

5. The ice maker according to claim 4, wherein the ice tray defines a recess between the first protrusion and the second protrusion.

6. The ice maker according to claim 4, wherein a distance of a space defined between the first protrusion and the second protrusion is greater than a width of one of the protrusion pins.

7. The ice maker according to claim 3, wherein each protrusion pin has an end that extends toward the protrusion portion and that is configured to, based on rotation of the rotary shaft, pass between an upper end of the protrusion portion and a bottom surface of each cell.

8. The ice maker according to claim 3, wherein the protrusion portion has an arc shape corresponding to an inner shape of each cell, and
wherein the protrusion portion extends from a first end located at a first height vertically above a bottom of each cell to a second end located at a second height vertically above the bottom of each cell, the second height being different from the first height.

9. The ice maker according to claim 8, wherein each cell is configured to accommodate water to a maximum water level with respect to the bottom of each cell, and
wherein the first end of the protrusion portion is disposed vertically above the maximum water level.

10. The ice maker according to claim 9, wherein each protrusion pin is configured to, based on rotation of the rotary shaft, start to contact the ice piece at a starting area of each cell, and
wherein the first end of the protrusion portion is located at the starting area.

11. The ice maker according to claim 9, wherein the second end of the protrusion portion is disposed vertically below the maximum water level.

12. The ice maker according to claim 9, wherein each cell is configured to accommodate water to a normal water level less than the maximum water level, and
wherein the second end of the protrusion portion is disposed vertically below the normal water level.

13. The ice maker according to claim 11, wherein each protrusion pin is configured to, based on rotation of the rotary shaft, contact the ice piece at a starting area of each cell, and
wherein the second end of the protrusion portion is located at an opposite side of the starting area.

14. The ice maker according to claim 1, wherein the protrusion portion has an upper end that has a round shape.

15. The ice maker according to claim 1, wherein the protrusion portion has an upper end that has an angular shape.

16. The ice maker according to claim 1, wherein the protrusion portion has an upper end comprising a flat surface.

17. A refrigerator comprising:
a cabinet that defines a refrigerating compartment;
a refrigerating compartment door configured to open and close at least a portion of the refrigerating compartment;
an ice maker located at the refrigerating compartment door and configured to generate ice; and
an ice bank located vertically below the ice maker and configured to receive ice pieces discharged from the ice maker,
wherein the ice maker includes:
an ice tray configured to receive water, the ice tray comprising a plurality of partition ribs that partition an inner space of the ice tray into a plurality of cells,
an ejector that is configured to rotate relative to the ice tray, that is configured to cause rotation of ice pieces in a rotation direction relative to the ice tray, and that is configured to discharge the ice pieces from the ice tray, and
a motor configured to drive the ejector to rotate in a first direction and a second direction opposite to the first direction, and
wherein the ice tray further comprises a protrusion portion that is located at each cell, that protrudes from a lower surface of each cell to increase a contact area between water and the ice tray, and that extends along the lower surface of each cell in a direction corresponding to the rotation direction of the ice pieces relative to the ice tray,
wherein a vertical cross-section of the protrusion portion has a constant height with respect to the lower surface of each cell and extends in the direction corresponding to the rotation direction of the ice pieces, and
wherein the protrusion portion is spaced apart from the plurality of partition ribs and configured to contact water accommodated in each cell.

18. The refrigerator according to claim 17, wherein the lower surface of each cell has a curvature that is constant in the rotation direction of the ice pieces relative to the ice tray.

19. The refrigerator according to claim 17, wherein the ejector comprises:
a rotary shaft connected to the motor and configured to rotate about an axis that extends toward the motor; and
protrusion pins that protrude radially outward from the rotary shaft toward the plurality of cells, respectively, each protrusion pin being configured to contact an ice piece in a corresponding cell of the plurality of cells.

20. The refrigerator according to claim 17, further comprising a dispenser located at the refrigerating compartment door and configured to discharge the ice pieces from the ice bank.

* * * * *